Nov. 14, 1972   L. C. PORTER ET AL   3,702,747
APPARATUS FOR PRODUCING ISOTROPIC FOAMED STOCK
Original Filed Jan. 30, 1968                16 Sheets-Sheet 1

LAWRENCE C. PORTER &
KENNETH E. GRAVES
INVENTORS

BY

FIDLER & BARD
ATTORNEYS

LAWRENCE C. PORTER &
KENNETH E. GRAVES
INVENTORS

BY

FIDLER & BARD
ATTORNEYS

Nov. 14, 1972     L. C. PORTER ET AL     3,702,747

APPARATUS FOR PRODUCING ISOTROPIC FOAMED STOCK

Original Filed Jan. 30, 1968     16 Sheets-Sheet 3

LAWRENCE C. PORTER &
KENNETH E. GRAVES
      INVENTORS

BY

FIDLER & BARD
    ATTORNEYS

LAWRENCE C. PORTER &
KENNETH E. GRAVES
INVENTORS

BY

FIDLER & BARD
ATTORNEYS

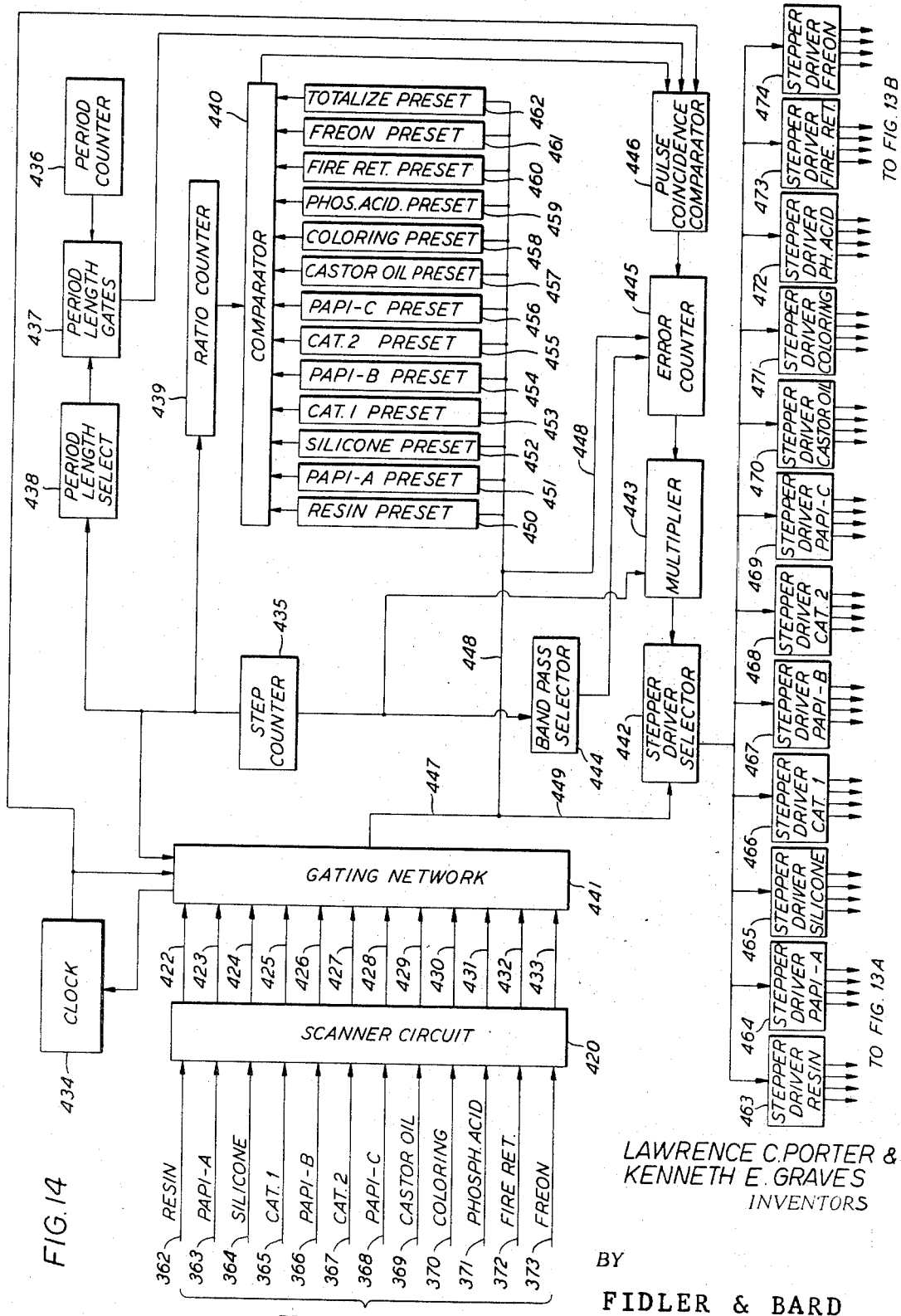

LAWRENCE C. PORTER &
KENNETH E. GRAVES
INVENTORS

BY

FIDLER & BARD
ATTORNEYS

LAWRENCE C. PORTER &
KENNETH E. GRAVES
INVENTORS

BY

FIDLER & BARD
ATTORNEYS

Nov. 14, 1972 L. C. PORTER ET AL 3,702,747
APPARATUS FOR PRODUCING ISOTROPIC FOAMED STOCK
Original Filed Jan. 30, 1968 16 Sheets-Sheet 16

LAWRENCE C. PORTER &
KENNETH E. GRAVES
INVENTORS

BY

FIDLER & BARD
ATTORNEYS

United States Patent Office 3,702,747
Patented Nov. 14, 1972

3,702,747
APPARATUS FOR PRODUCING ISOTROPIC FOAMED STOCK
Lawrence C. Porter, Palos Verdes Peninsula, and Kenneth E. Graves, Saratoga, Calif., assignors to The Upjohn Company, Kalamazoo, Mich.
Original application Jan. 30, 1968, Ser. No. 701,596, now Patent No. 3,606,903. Divided and this application Nov. 18, 1970, Ser. No. 90,500
Int. Cl. B29d 27/04
U.S. Cl. 425—4                 16 Claims

ABSTRACT OF THE DISCLOSURE

An improved one-shot system for producing polyurethane foam stock and the like, including separate tank means containing different liquid reactants, separate mixing means for combining reactants, separate reactant delivering means, measurement circuits for deriving measurements of parameters such as the mass transfer rate of each reactant, and further including an automatic controller system responsive to such measurements for adjusting and controlling the parameters with respect to preselected values. A controller system is provided for continuously sampling the various incoming measurement signals sequentially, and for deriving error signals from a comparison of various functional relationships of the samples relative to pre-established optimums. Control circuits are also included for continually adjusting the operation of the system in response to the error signals.

PRIORITY

This is a divisional application of copending application Ser. No. 701,596, filed Jan. 30, 1968, now Pat. No. 3,606,903, entitled "Method and Apparatus for Producing Isotropic Foamed Stock."

BACKGROUND OF INVENTION

This invention relates to the production of cellular synthetic resin stock, and more particularly relates to methods and apparatus for producing foamed synthetic resin stock, especially polyurethane foam, having a substantially rectangular cross-section and which is generally isotropic in character.

It is well known to produce urethane foam stock by combining a suitable polyhydroxyl compound, a blowing agent such as Freon, and a polyisocyanate, to produce a foam which solidifies into a cellular material. It is also well known to at least partially confine such foam, during its hardening process, to produce stock (hereinafter referred to as "bun") which is thereafter cut into smaller pieces or billets for sale to fabricators.

Depending upon the choice of the polyhydroxyl (hereinafter referred to generally as the "resin"), the bun can be made either rigid or flexible. The structure of urethane foams, whether rigid or flexible, consists of a network of cells which are preferably of a substantially uniform size and shape. In flexible foams, the cells are open. In rigid foams, however, the cell structure is closed. If the rigid foam material is intended for certain purposes such as thermal insulation, substantially uniform cell structure is greatly desired in order to provide uniform compressive yield strength characteristics which are substantially the same along the X, Y and Z directional axes along which a force may be applied.

As hereinbefore mentioned, polyurethane foam is produced by the polymerization of the resin and the selected isocyanate. The Freon is added to produce the leavening effect which causes the resulting polyurethane mass to "rise" and to assume the cellular character sought to be obtained. Hence, all polyurethane foam manufacturing techniques generally comprise the steps of disposing the resin, isocyanate and Freon mixture, in a restricted or partially restricted enclosure, to create a bun having generally preselected cross-sectional dimensions. More particularly, the liquid mixture of resin, isocyanate and Freon is preferably poured onto a moving conveyor( such as an endless belt) which carries the mixture into and through a tunnel-like enclosure or mold as it rises and solidifies. In other words, the mixture rises within the tunnel, but the cross-sectional dimensions of the tunnel tend to restrict the bun and give it the cross-sectional shape and dimension sought to be obtained, as well as to apply a preselected pressure to the foam to control the shape of the cells and the homogeneity of the foam.

As the completed bun is carried out of the exit end of the tunnel, it may be cut into preselected lengths or billets which may then be sold to fabricators who will cut the billets into such shapes as may be desired by the ultimate consumers. However, since most of the billets are intended to be cut into slabs or planks which also have rectangular cross-sections, it will be apparent that waste will occur unless the bun itself has a generally rectangular cross-section, since any rounded or irregular side portions must usually be discarded.

Methods and apparatus for commercially producing an isotropic polyurethane bun having a preselected density and compressive strength, and also having a substantially rectangular cross-section, have long been sought. Prior art techniques have succeeded in commercially producing buns which are generally satisfactory from the standpoint of density and compressive strength. Furthermore, buns having substantially rectangular cross-sections have also been produced in commercial quantities, although only at a considerable effort, and at a cost which is not competitive with the cost of the nonrectangular buns. However, it has hitherto been impossible, with the methods and apparatus of the prior art, to commercially produce a rectangular bun having the desired density and compressive strength characteristics, and at a cost which is competitive with the price of nonrectangular buns.

In addition to the basic foam constituents hereinbefore mentioned, it has been found desirable to include certain other materials in the mixture to produce a polyurethane foam having ideal properties. For example, a surfactant such as polyoxyalkylene-polydimethylsiloxane (hereinafter referred to as "silicone") is usually included in selected amounts to regulate cell size and cell wall stability during foaming. Water is included in regulated amounts to give the foam the proper degree of "flowability," during the leavening stage, so that the bun will fill the upper corners of the tunnel and thus assume a substantially rectangular cross-section. Catalysts such as triethylamine and castor oil are also usually included in proper proportions to achieve the desirable balance between the foaming and polymerization reactions, and to control the speed of such reactions. Coloring substances may also be included in the resin isocyanate mixture.

Notwithstanding the use of these other catalysts and constituents, it should be appreciated that the basic reaction between the resin and the polyisocyanate is relatively quite rapid and is thus quite difficult to control during commercial manufacture of polyurethane bun. Although a one-shot process is theoretically the most efficient for the commercial manufacture of polyurethane, it has been found necessary for the most part to employ either semiprepolymer or complete prepolymer systems in order to produce an isotropic bun having the proper characteristics of density, compressive strength, rectangular cross-sectional configuration, etc.

The problem of using a one-shot process is further complicated by the fact that there are other materials used in producing polyurethane foam, besides the basic reactants, foaming agent, and catalysts hereinbefore mentioned. For example, coloring agents and fire retardants are often included. Although constituents such as these are generally thought of as non-reacting components, this is not strictly true since they are usually combined with base resin or other suitable resins compatible with the foam system. These resins are reactive and must be considered as part of the reactive system.

Another complication arises because of unavoidable variations in the purity and quality of the components. Due to economic limitations, the various constituents are of industrial grade, and thus the character of the reaction may sometimes vary unexpectedly simply because a particular component has been taken from a different batch. In addition, changes in environmental parameters, such as humidity, temperature, and barometric pressure, may also affect the speed and character of the reaction, and the size and distribution of the cells in the resulting polyurethane foam.

Once the basic reactants (the resin and the isocyanate) have been physically combined, the resultant reaction will proceed relentlessly to a conclusion and the process can neither be halted, retarded or reversed. Thus, a one-shot process is difficult to control since the character of the reaction is largely apparent only in the finished polyurethane foam, although extremely skilled and experienced operating personnel can sometimes make very limited quality estimates from observation of certain physical characteristics of the reaction during intermediate stages of the process. Unfortunately, however, it is usually difficult to determine within required limits the precise adjustment to be made, and thus it is usually necessary to stop all production completely for an hour or more each time it is necessary to make any adjustment in the proportions of the various constituents. Moreover, it is often necessary to make such an adjustment solely on the basis of empirical determinations, and thus it will be apparent that it is often necessary to stop and start a one-shot process several times before a satisfactory product can be produced.

Since the various factors which contribute to the character of the product are all either selectively controllable or capable of being counteracted, it has long been desired to develop a self-balancing system continually responsive to measured variations in each significant parameter according to a preselected relationship. For various reasons not immediately apparent to those unfamiliar with this art, however, no such system has previously been developed.

In the first instance, conventional control equipment is designed to operate on a system of binary numbers, whereas the various parameters needed to be controlled are measured for the most part in terms of mass transfer units, belt speed and the like. The language of binary numbers is not one with which operators of polyurethane foam systems are generally familiar, and thus it is necessary to mate the system controller to the system, rather than to mate the foam system indicator outputs to the controller, as is generally done with controllers of this class.

Another difficulty exists in the fact that the production system must be controlled with extreme precision, notwithstanding that line blending is involved in a one-shot system for producing polyurethane foam. Thus, it is desirable to use the inherent precision of digital logic for controlling the production system, since analog circuitry and systems are well known to be both expensive and difficult to erate with required precision for long periods of time. However, it is also expensive and complex to mate a digital system with a line blending operation since the handling and registering of fluid flow measurements is inherently incompatible with the basic concept of digital logic, and thus it is necessary to include extensive conversion circuitry with systems of the prior art.

These disadvantages of the prior art are overcome with the present invention, and novel methods and apparatus are provided herein for commercially manufacturing either flexible or rigid homogeneous polyurethane bun, which is isotropic, and which has such other preselected chemical and physical properties as may be desired. It is a feature of the present invention to provide novel methods and apparatus for commercially manufacturing flexible or rigid polyurethane bun having preselected characteristics and properties by means of a one-shot process. It is a further feature of the present invention to provide a one-shot system employing a controller section responsive to continuously generated measurements of various selected parameters to continuously adjust and maintain productivity according to a preselected relationship. It is also a feature of the present invention to provide a system of the foregoing description including means for providing directly recordable signals for the purpose of quality control.

SUMMARY

These advantages of the present invention are preferably obtained by novel methods and apparatus employing a one-shot system, wherein improved monitoring methods and apparatus are provided for directly and accurately indicating and regulating the proportions of the various constituents in terms of mass transfer units, for selectively adjusting the inclination angle of the tunnel during operation of the system and process, for raising and lowering the pouring spout and the input end of the tunnel as a unit in order to maintain a preselected spacing between the spout and the floor of the tunnel, for synchronizing the conveyor speed and the saw movement, and for providing lateral as well as vertical saw movement.

In addition, a novel controller section or circuit is preferably provided which receives the aforementioned measurements and compares them on the basis of a pre-established relationship, for the purpose of deriving correction or adjustment output signals functionally related to such comparison, and provision is included for rendering the production system responsive to such adjustment signals as will hereinafter be explained.

These and other features and advantages of the present invention will be apparent from the following detailed description, wherein reference is made to the figures in the accompanying drawings.

THE DRAWINGS

Figure 1:
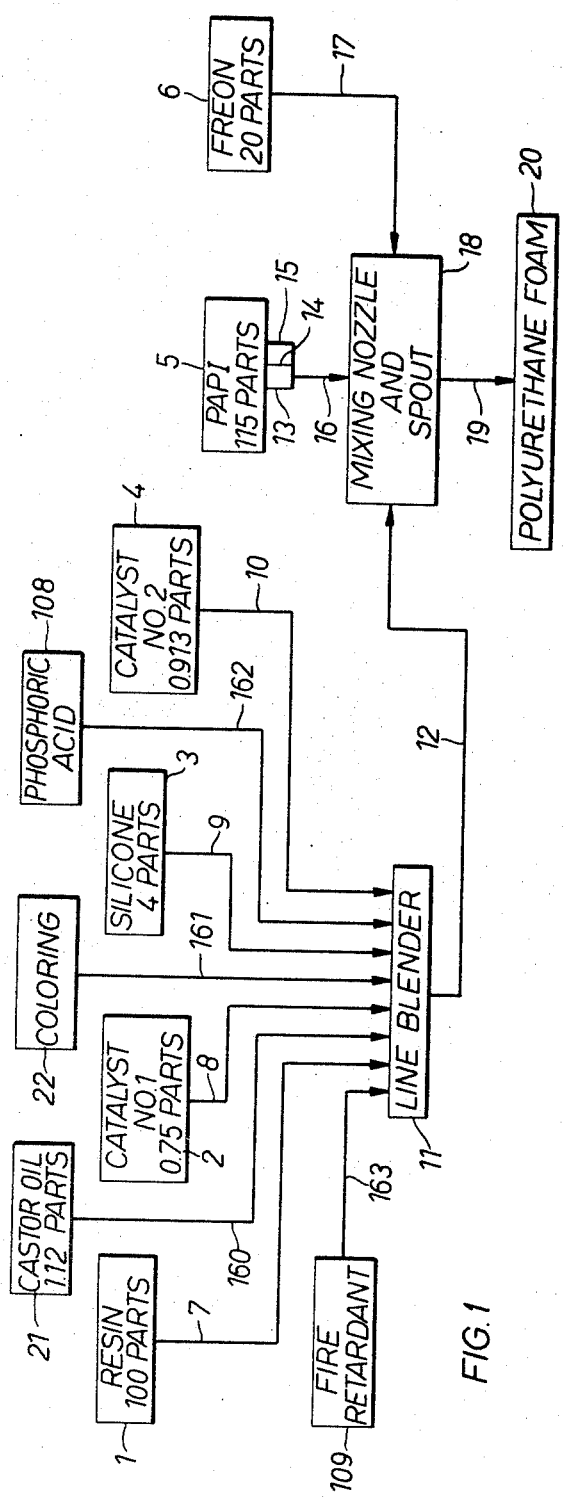
FIG. 1 is a basic flow diagram showing the mixing stages of the various constituents or ingredients utilized in a one-shot method and system of the type discussed herein for manufacturing polyurethane foam.
Figure 9A:
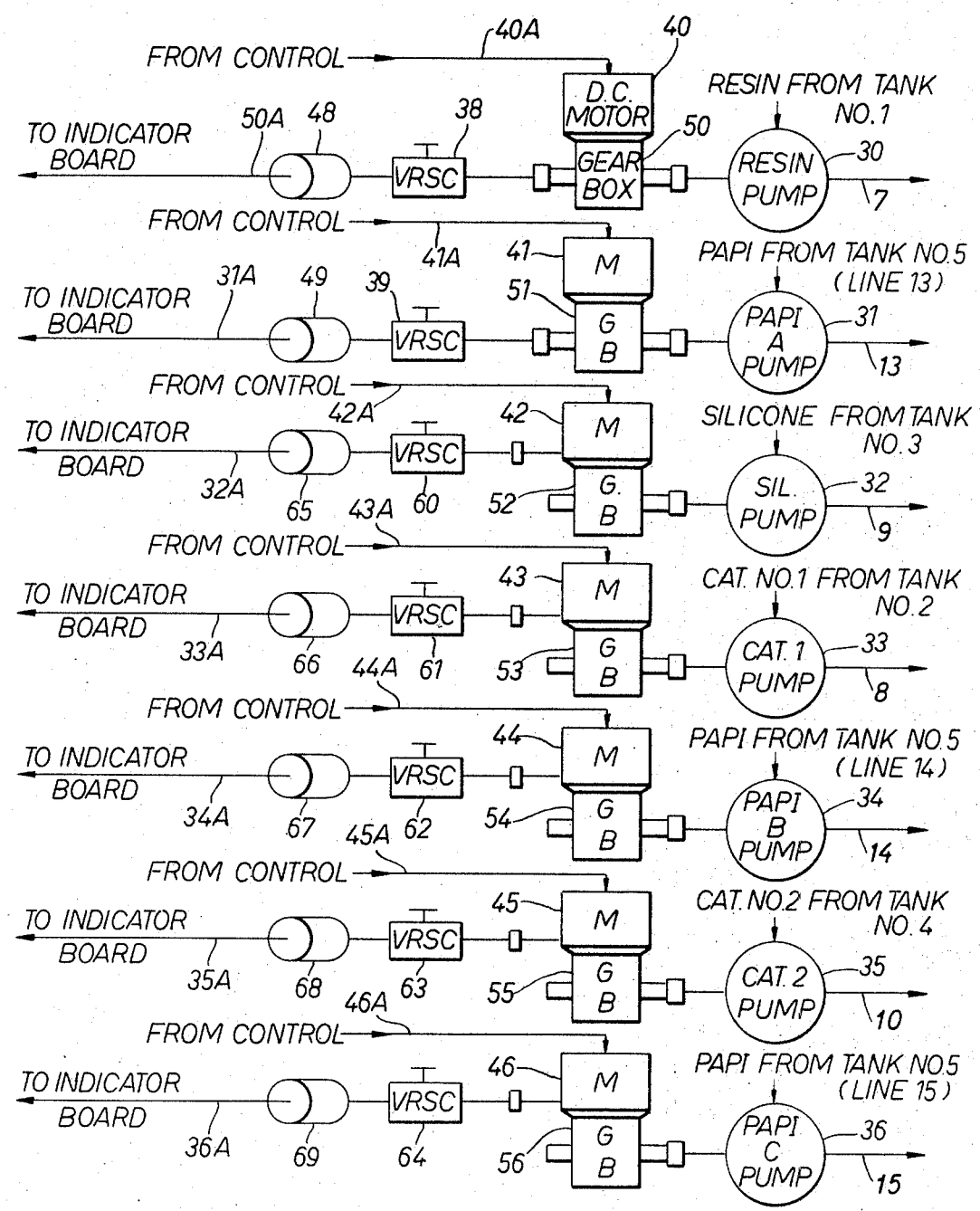
Figure 9B:
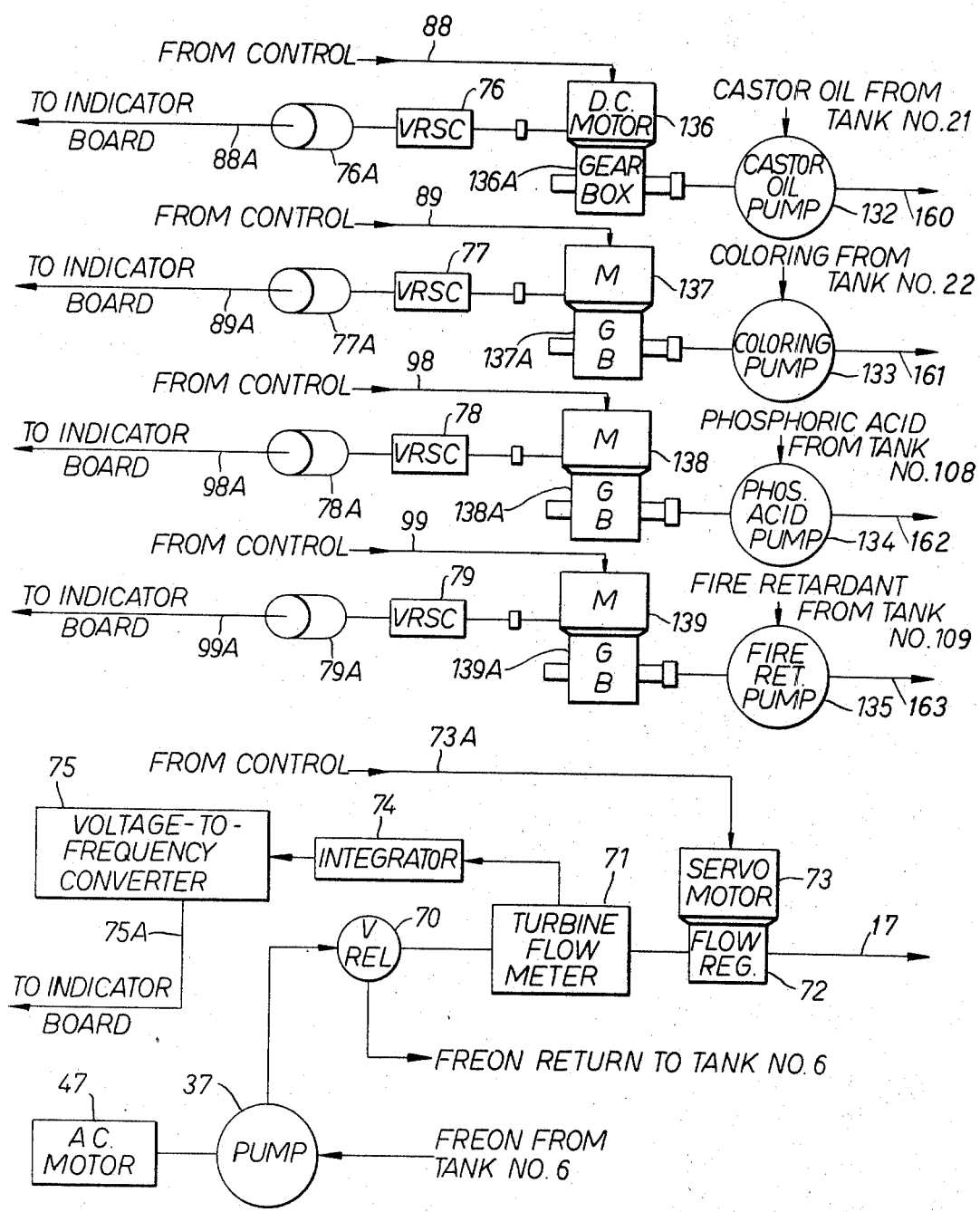

FIGS. 9A and 9B together provide a functional representation of a system for monitoring and controlling the mixing of the constituents generally depicted and represented in FIG. 1.

Figure 10:
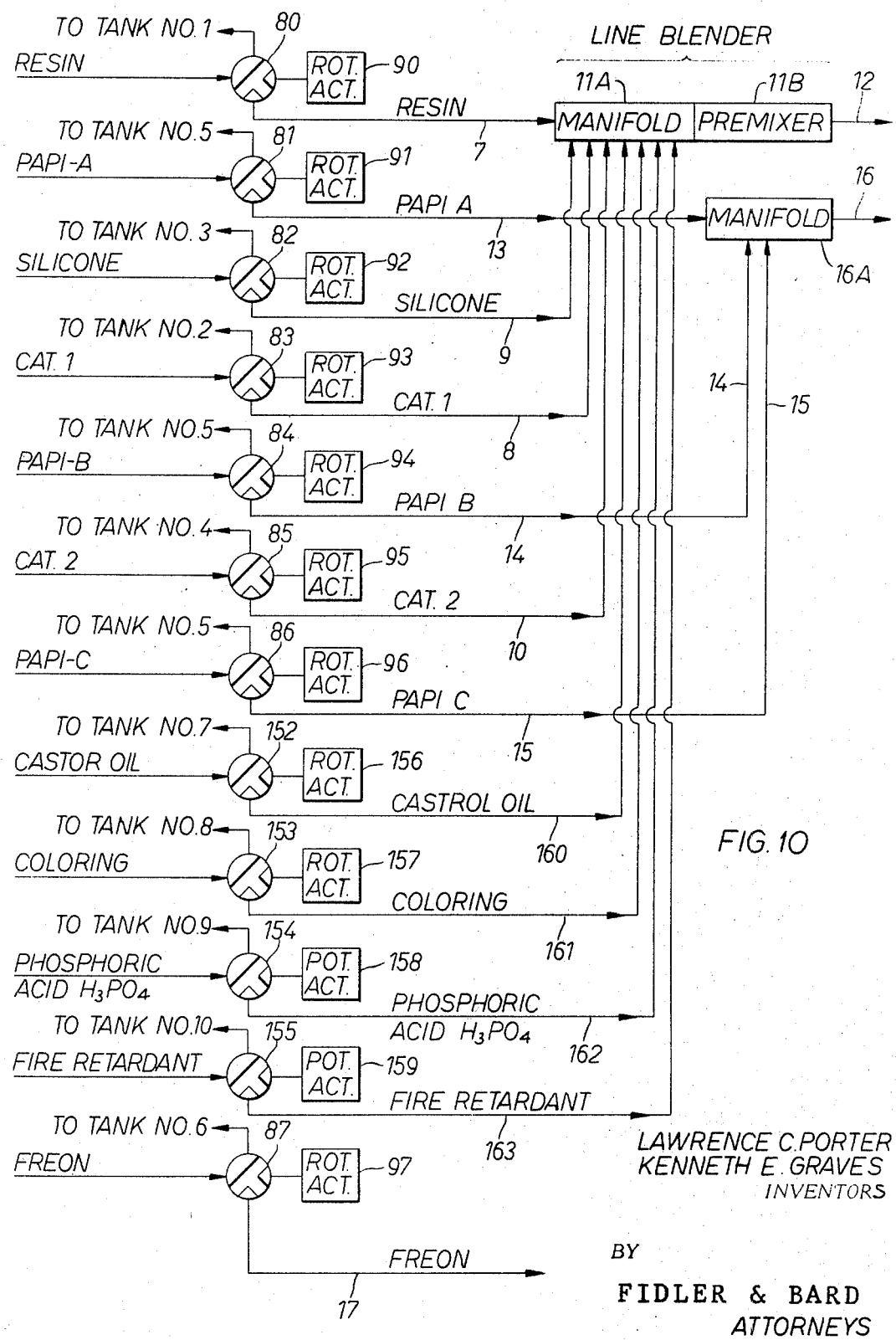

FIG. 10 is a functional representation of a further portion of the flow system generally depicted in FIG. 1.

Figure 11A:
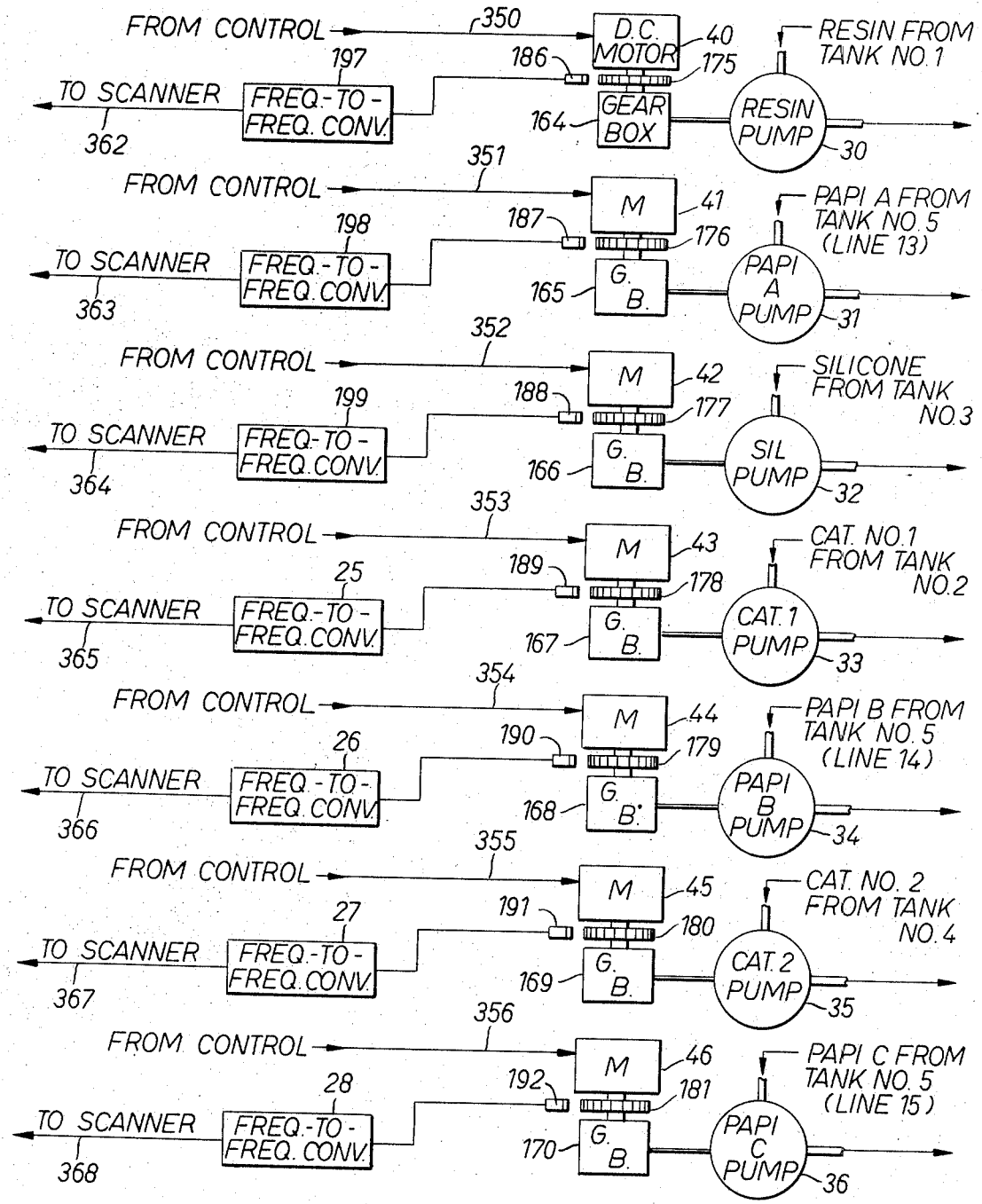
Figure 11:
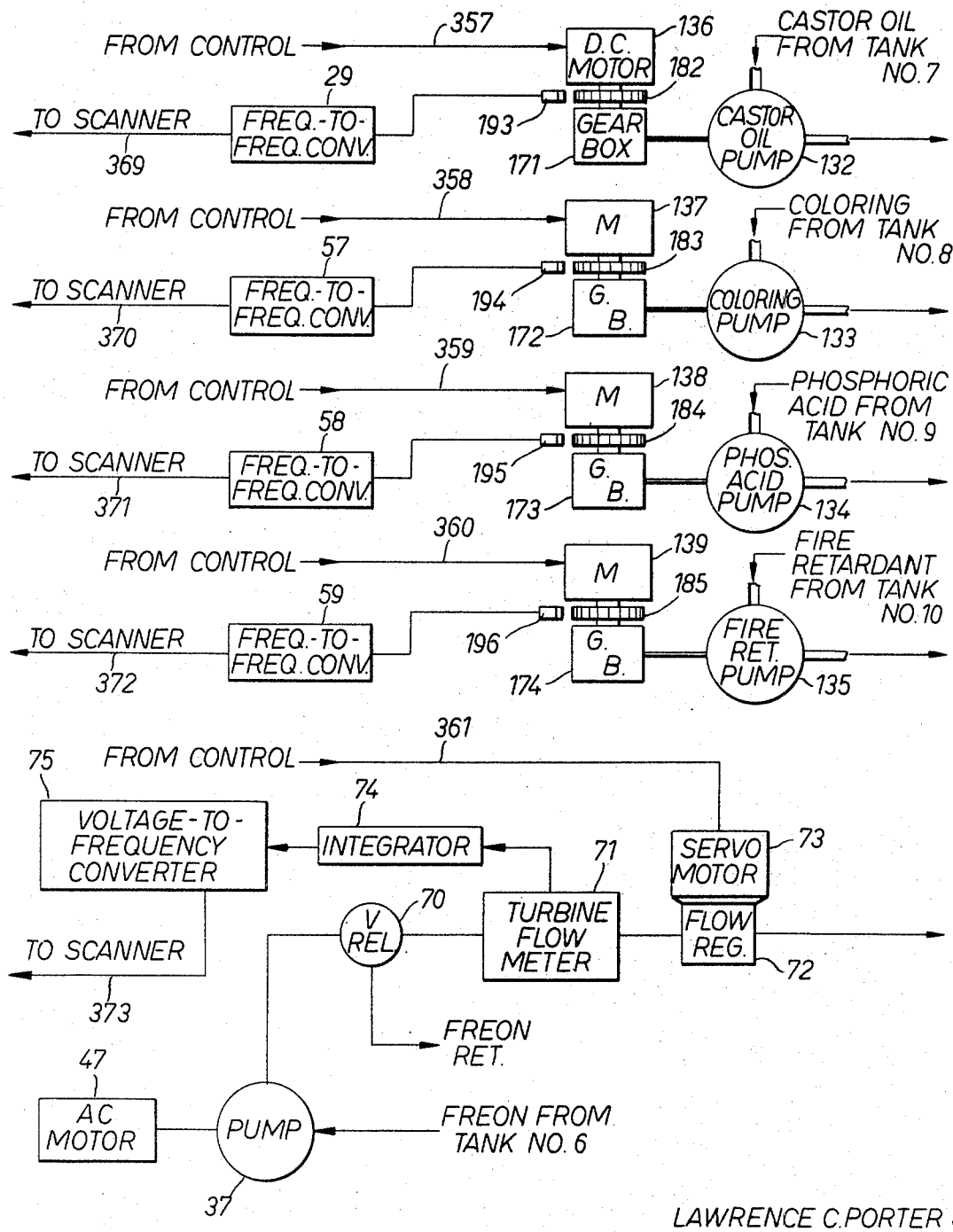

FIGS. 11A and 11B together provide a functional representation of an alternative form of the circuitry and components represented in FIGS. 9A and 9B.

Figure 12A:
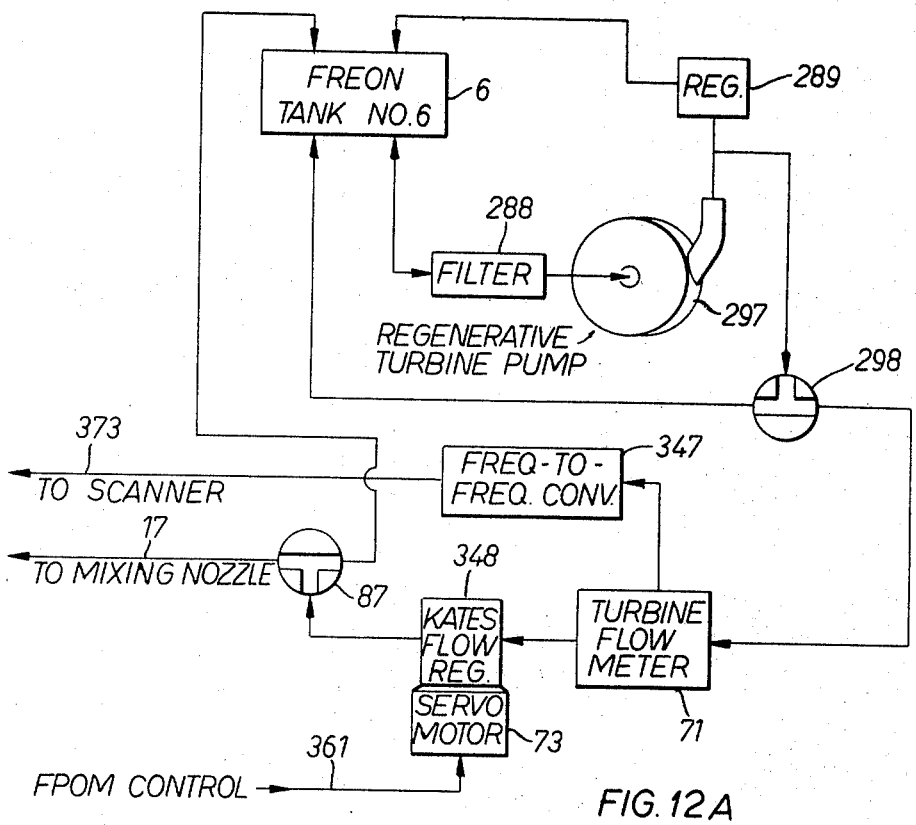
Figure 12B:
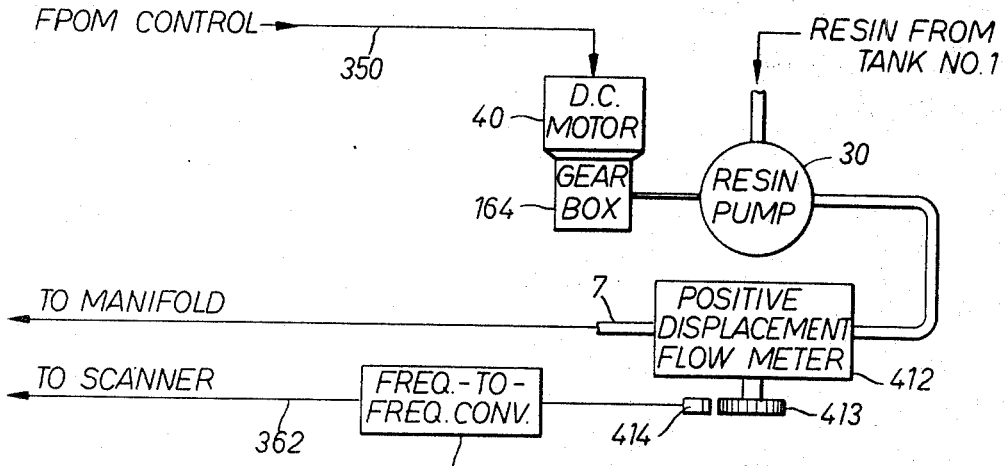

FIGS. 12A and 12B provide functional representations of additional alternative forms of selected portions of the circuitry represented by FIGS. 9A and 9B, and by FIGS. 11A and 11B.

Figure 13A:
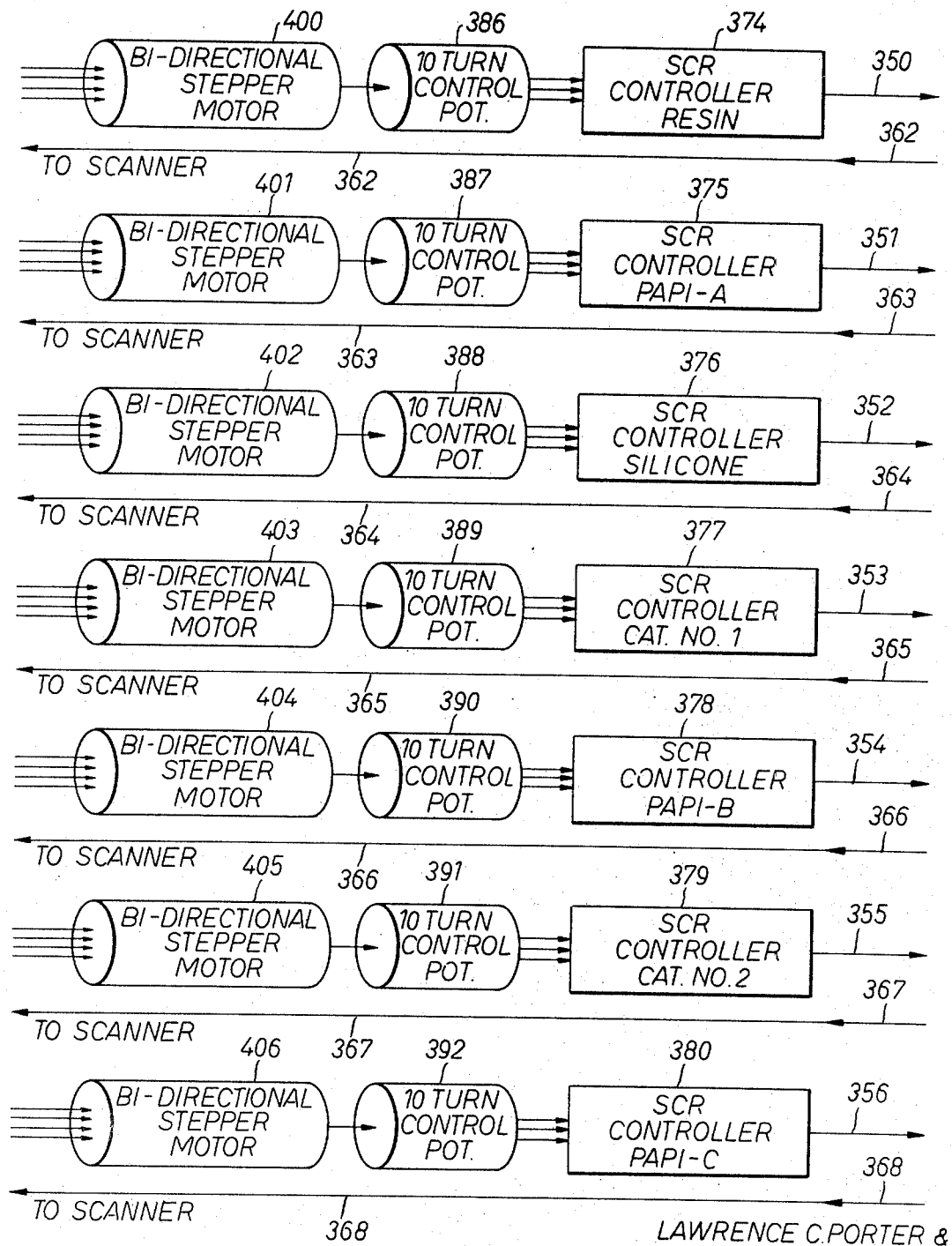
Figure 13B:
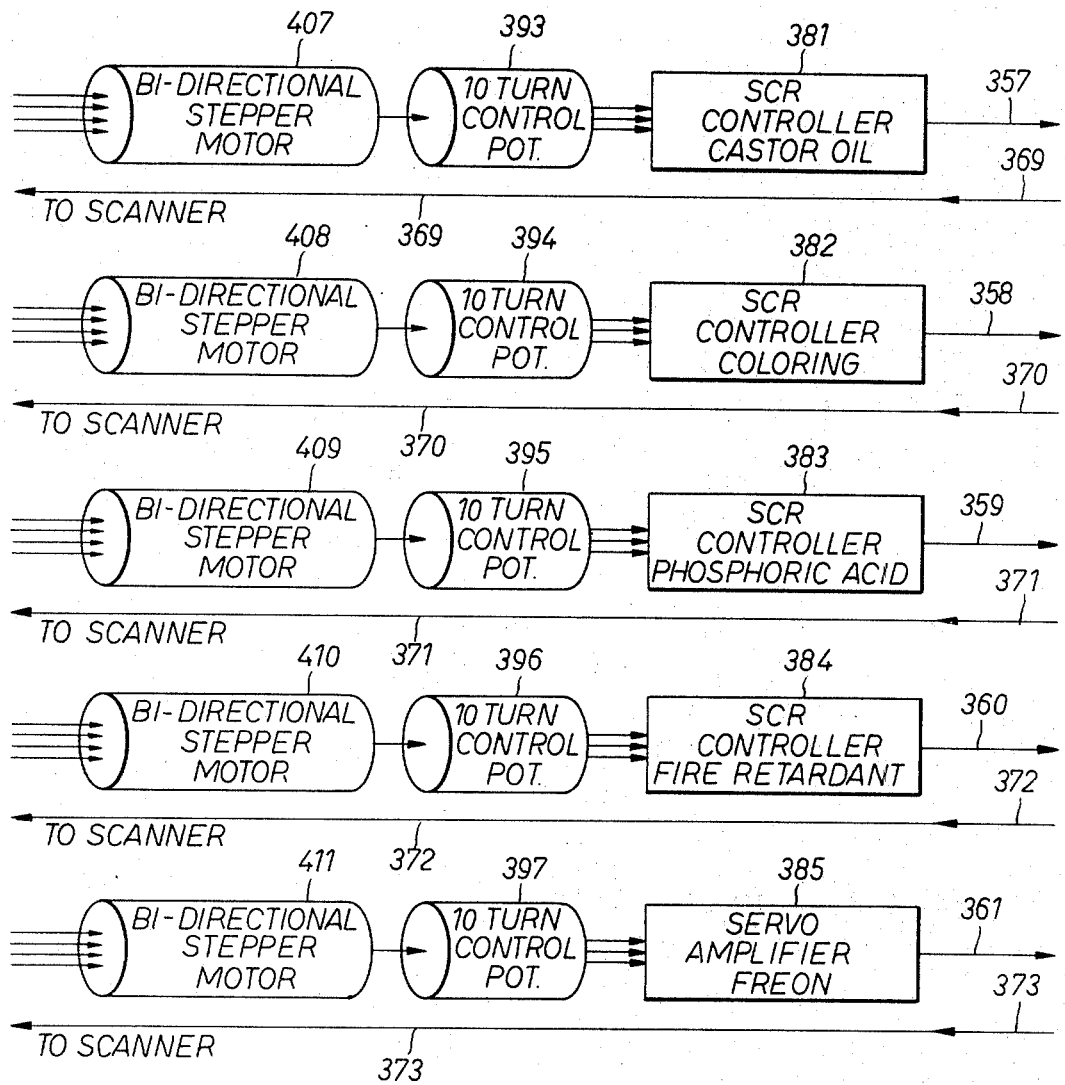

FIGS. 13A and 13B provide a functional representation of a suitable circuit for coupling the circuitry illustrated in FIGS. 9A, 9B, 11A, 11B, 12A and 12B, to a suitable control and indicator section.

FIG. 14 is a functional representation of a suitable controller system useful for operating a production system of the type illustrated in FIGS. 1–13.

Figure 15A:
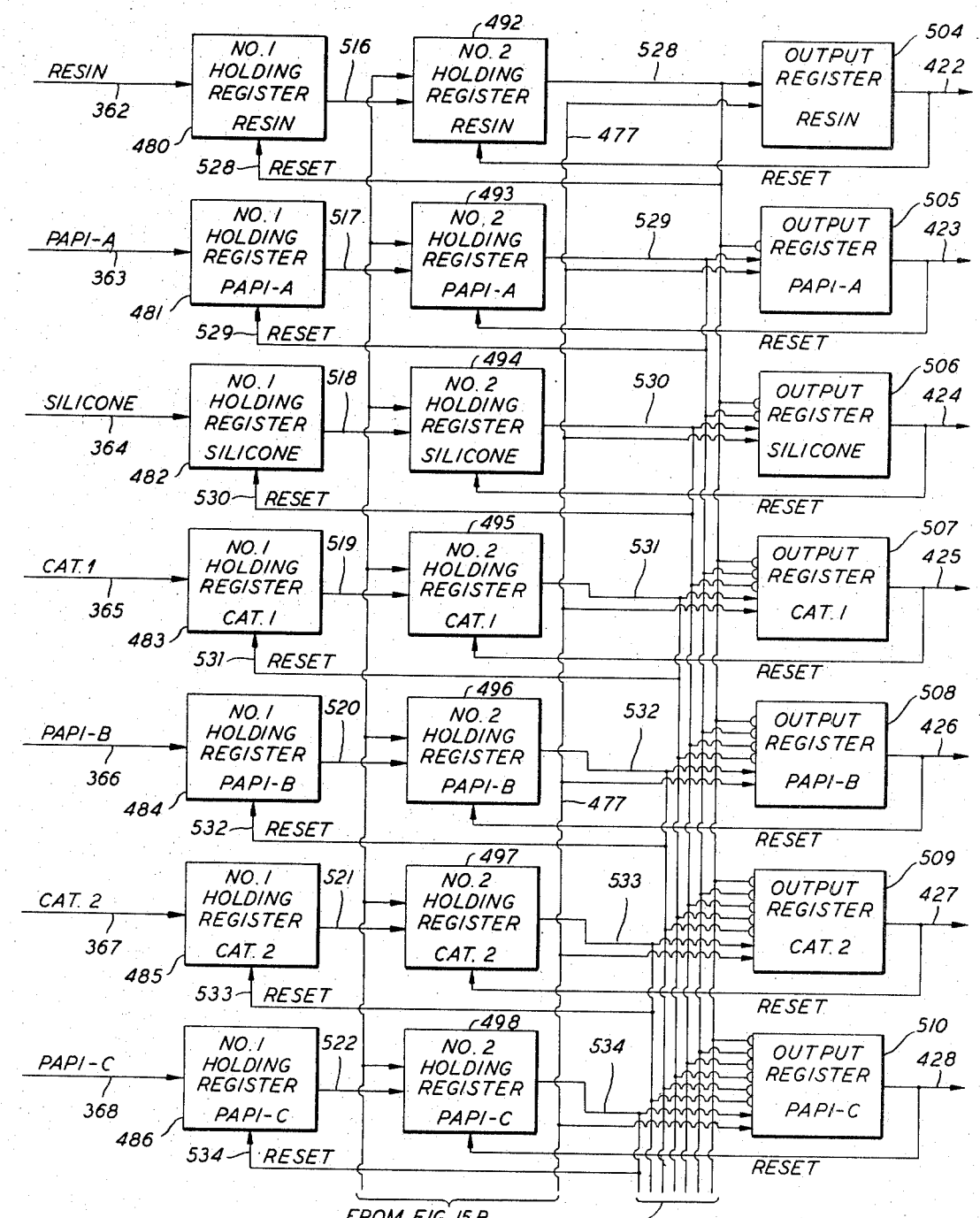
Figure 15B:
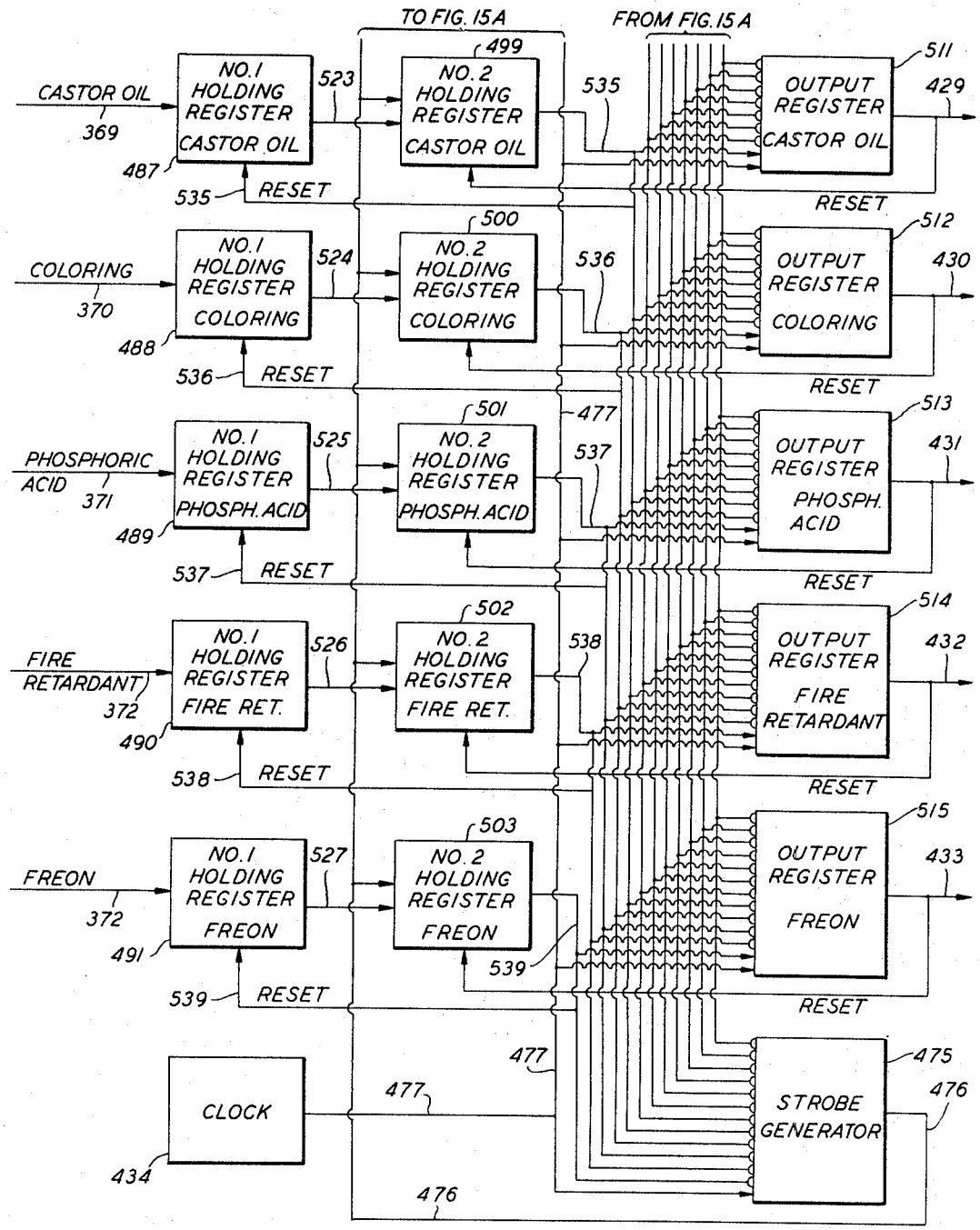

FIGS. 15A and 15B represent a more detailed functional representation of a portion of the system illustrated in FIG. 14.

Figure 16:
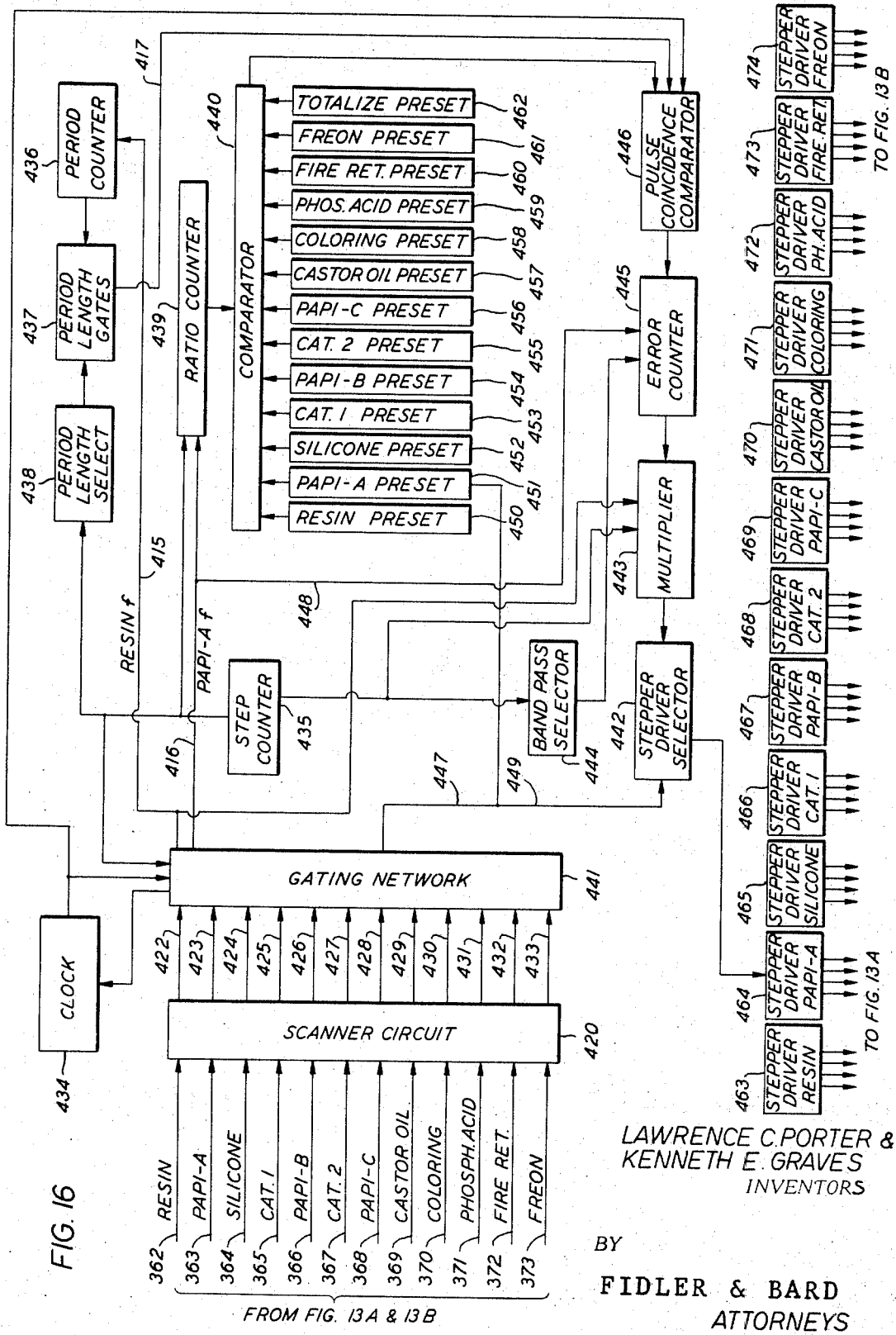

FIG. 16 depicts the system illustrated in FIG. 14 during selected phases of operation.

Figure 17:
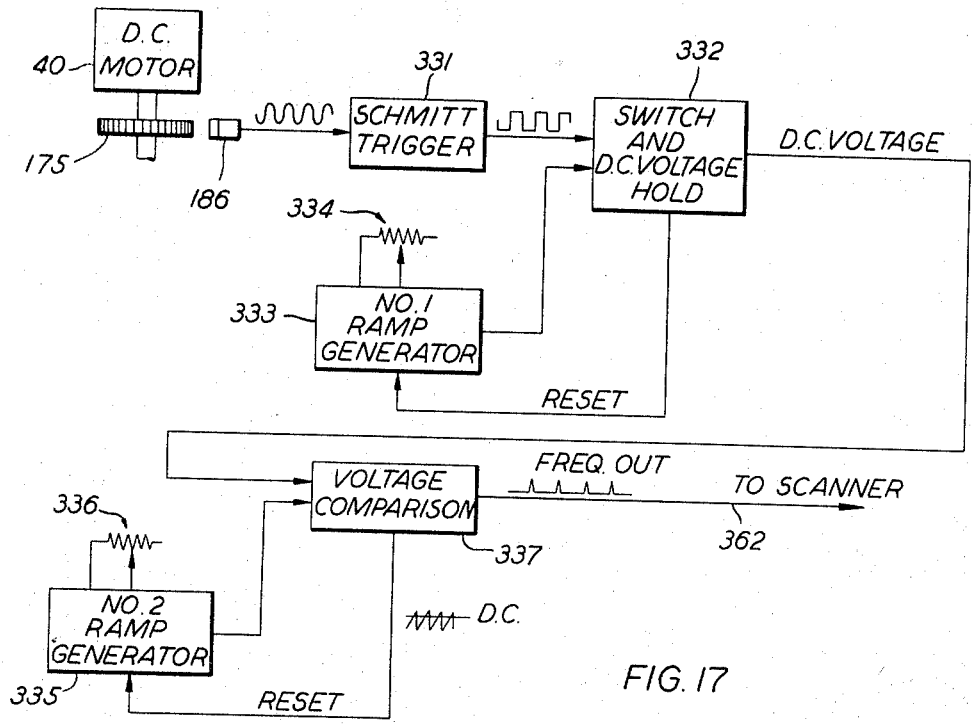

FIG. 17 depicts a more detailed functional representation of an exemplary portion of the structures illustrated in FIGS. 11A and 11B and FIGS. 12A and 12B.

Figure 18:
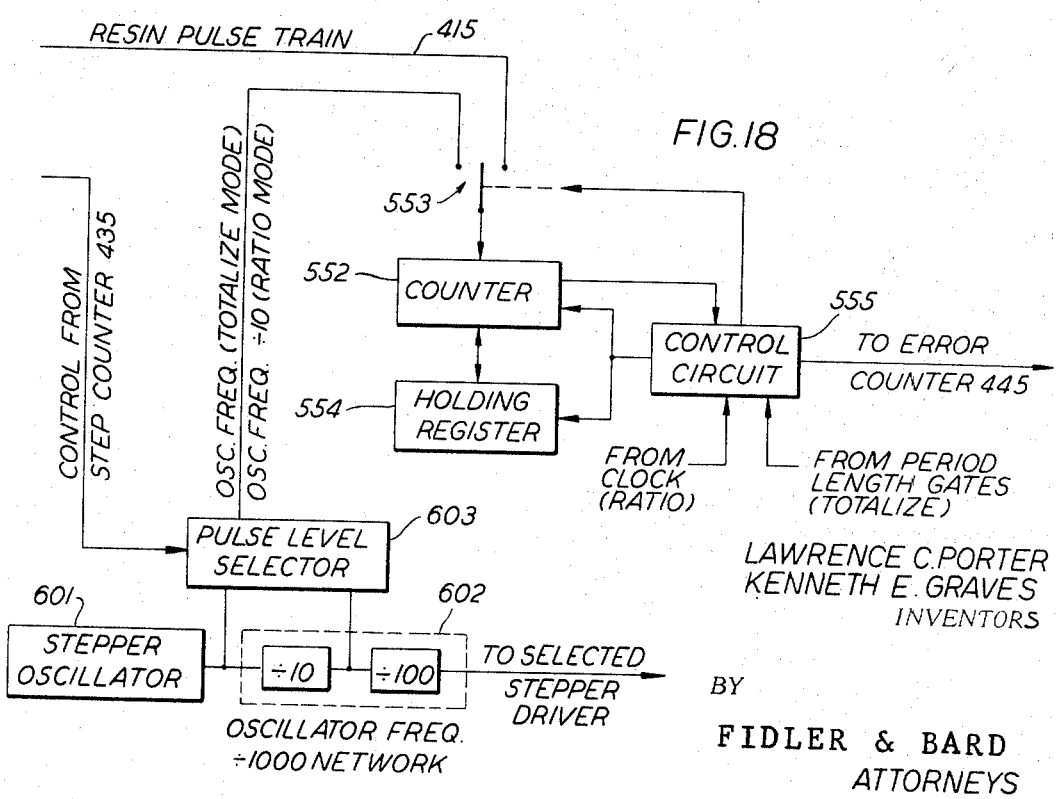

FIG. 18 depicts a more detailed functional representation of another selected portion of the system illustrated in FIG. 14.

DETAILED DESCRIPTION

Referring now to FIG. 1, there may be a functional representation of ten separate tanks 1–6, 21, 22, 108 and 109, each holding a different constituent or ingredient, and each having its respective output line interconnected with either a manifold or line blender 11, or with a mixing nozzle 18, to provide a continuous or "one-shot" production of polyurethane foam 20. More particularly, it may be seen that in a suitable arrangement, Tank No. 1 holds resin, Tank No. 2 contains a first catalyst such as a suitable amine, Tank No. 3 contains silicone, Tank No. 4 contains a second catalyst such as a 50:50 mixture of water and a selected resin, and Tank No. 5 contains a suitable isocyanate such as polymethylene polyphenylisocyanate and hereinafter referred to as "PAPI" (a registered trademark of The Upjohn Company).

Tank No. 6 will preferably contain a suitable blowing or leavening agent such as Freon, Tank No. 7 contains oil, Tank No. 8 may contain a coloring agent or dye, and Tank No. 9 preferably contains phosphoric acid. It is a well known characteristic that polyurethane is flame resistant in contrast to similar materials such as polystyrene foam. However, this characteristic may be enhanced by the addition of a suitable fire retardant which may be contained in Tank No. 10.

The two basic reactants are located in Tanks No. 1 and No. 5, and although the substances in the other tanks may enter into and affect the reaction, they are effectively nonreactant with each other or with either of the two reactants separately. Hence, it is desirable as may be seen in FIG. 1 to connect the outputs of Tanks Nos. 1–4 via conduits 7–10, to a manifold or line blender 11, where they may be combined physically into a mixture having the desired proportions, before adding the other reactant. Accordingly, the mixing nozzle 18 is connected to only three input lines, i.e., those connected to the line blender 11, and Tanks Nos. 5 and 6, only.

More particularly, output lines 7–10 and 160–163, respectively, of the Tanks 1–4, 21, 22, 108 and 109 holding the resin, the first catalyst, silicone, the second catalyst, castor oil, coloring, phosphoric acid, and first retardant, may be seen to be connected to deliver material into the line blender 11. The Freon is delivered from Tank 6 into the mixing nozzle separately through line 17.

The PAPI preferably flows from Tank No. 5 into three separate output lines 13–15, as will hereafter be made apparent, and which are connected to a suitable manifold (not depicted) having a single output line 16 connected to the mixing nozzle 18. After the various ingredients reach the mixing nozzle 18 in the proper proportions, they are thoroughly intermixed before they can interact, and the mixture is then ejected through a spout 19 to form into the polyurethane foam 20.

It should be remembered that the resin in Tank 1 and the PAPI in Tank 5 rapidly interact when commingled in the mixing nozzle 18. Furthermore, it should be noted that Freon tends to cause the other constituents in the mixture passing between the blender 11 and the mixing nozzle 18 to separate. Since the isotropicity of the resultant "bun" depends in large part upon the thorough intermixing of all constituents before the polymerization interaction can proceed to any substantial degree, it is an advantage to first intermix those constituents which do not interact (the resin, silicone, catalysts, etc.) and thereafter to intermix only three active ingredients or constituents in the mixing nozzle 18. Accordingly, this is why it is preferable to first intermix the constituents in Tanks 1–4, 21, 22, 108 and 109 in the line blender 11, and then to combine only three separate "constituents" within the mixing nozzle 18 proper.

The flow of liquid Freon, from Tank 6 to the mixing nozzle 18, may be provided by suitable pumping means as will hereinafter be described. Alternatively, Tank 6 may be pressured by a nonreacting gas such as nitrogen, and the nitrogen pressure in Tank 6 can be used to force the Freon into and through the mixing nozzle 18 and spout 19.

The various structures and techniques hereinafter described, may conveniently be separated into those dealing directly with the mixing of the ingredients and the production of the resulting foam, and those dealing with the control of the operation. Hence, the description hereinafter following will arbitrarily be divided into those functions relating to production and those functions relating to control.

THE PRODUCTION SYSTEM

Figure 2:
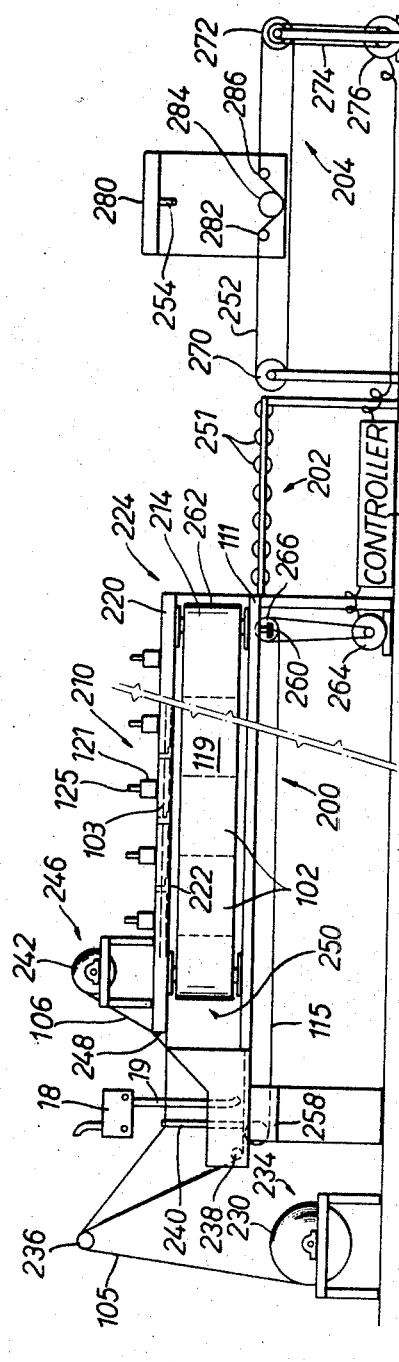
FIG. 2 is a pictorial representation of the major components of the preferred system employed for manufacturing polyurethane billets by means of the present invention.

Referring now to FIG. 2, there may be seen a functional and partly pictorial representation of an apparatus for receiving the mixture from the mixer spout 19 depicted in FIG. 1, and for forming the polyurethane foam into a proper bun. In particular, the production system may be generally defined as being comprised of three main components, i.e., the tunnel mold section 200, a transitional conveyor section 202, and a saw assembly 204. It is a function of the tunnel section 200 to receive the mixture of resin, PAPI, Freon, and the various catalysts and other ingredients, and to provide a mold wherein the mixture will foam up into a polyurethane bun having preselected dimensions and properties, and to properly wrap it in paper. It is the function of the transitional conveyor section 202 to conduct the "finished" and wrapped bun between the tunnel section 200 and the saw assembly 204, and it is the function of the saw assembly 204 to cut the finished and wrapped bun into polyurethane billets of a preselected length.

Referring now to the tunnel section 200, it may be seen in FIG. 2 to be generally comprised of a tunnel mold 210 having right and left side conveyor belts 119 (only one belt being depicted), a series of side panels 102 (only one side being depicted) disposed within the endless side belts, a bottom panel concealed within two bottom longitudinal struts 111 (only one strut being depicted), and a bottom conveyor belt 115, and a series of top panels 103 each supported by a truss-like frame 121 and support rod 125, and hidden between two top struts 220 (only one strut being depicted).

The concealed bottom and side panels are rigidly held in position to form the bottom and sides of the tunnel mold 210. The top panels 103 are adjustably positioned to provide a tunnel having a preselected height. However, as will hereinafter be explained in greater detail, each top panel 103 is spring-loaded downward so as to yield to excessive upward pressure of the bun in the tunnel.

It should further be noted that each top panel 103 is provided with a lower protruding lip 222, extending in the direction of movement of the bun through the tunnel mold 210 and projecting under the edge of the next adjacent top panel 103. This is provided so as to prevent the top panel 103 from impeding travel of the bun through the tunnel mold 210.

As may be seen in FIG. 2, there is preferably provided an endless bottom conveyor belt 115 rotatably mounted on the front and rear rollers 258 and 260 so as to rotate about the bottom panel. This bottom conveyor belt 115 is preferably synchronized with the side conveyor belts 119, as will hereinafter be explained, so as to conduct the bun through the tunnel 210 towards its exit end 224.

As will further be explained in detail, it is necessary as well as desirable that the bun be completely wrapped with paper or other suitable covering material as it passes out of the tunnel 210. Accordingly, a roll 230 of bottom paper 232 is shown mounted on a roller assembly 234, with the bottom paper 105 passing upward and over a top roller 236 and then downward and under a pair of creasing wheels 238, between two pairs of closely spaced, vertical support bars 240, whereby the bottom paper 105 assumes a U-shape as it passes under the spout 19 of the mixing nozzle 18. The two creasing wheels 238 are adjustably spaced apart a distance substantially equal to the width of the tunnel mold 210 so that the U-shaped bottom paper 232 will fit into the tunnel mold 210 without wrinkling. Thus the mixture of resin, PAPI, etc., received from the spout 19 is poured onto the bottom paper 105 rather than directly upon the endless bottom belt 115.

A narrower roll 242 of top paper 106 is located on a second roller assembly 246 mounted on top of the tunnel mold 210. As may be seen, the top paper 106 is passed downward under a rotatable creasing roller 248 to be formed into a U-shape before passing into and through the tunnel adjacent the bottom and side surfaces of the top panels 218.

As will hereinafter be discussed in detail, the tunnel section 200 is preferably inclinable with its pivot point located at or adjacent its exit end 224. Furthermore, when the entrance end 250 of the tunnel mold 210 is raised or lowered in order to vary its inclination, means hereinafter described in detail are preferably provided for maintaining a constant preselected spacing between the spout 19 and the bottom surface of the tunnel mold 210.

Means are preferably provided to move the mixing nozzle 18 and spout 19 backward and forward laterally across the bottom paper 105 at the entrance end 250 of the tunnel mold 210 to thereby deposit a preselected constant stream of mixture evenly upon the bottom paper 105. The speed and traverse of the mixing nozzle 18 and spout 19 are preferably controlled to regulate the pattern of mixture being deposited, and the speed of the conveyor belts can also be selectively controlled, all to assist in regulating the volume of bun being produced. Moreover, the mixing nozzle 18 can be caused to dwell for a preselected interval, at the end of each traverse, so as to further regulate the pouring pattern to insure homogeneity of the bun being produced.

As hereinbefore stated, the bottom conveyor belt 115 and the side conveyor belts 119 (only one being depicted) cooperate to draw the bottom paper 105 into the tunnel. Thus, the liquid mixture deposited from the spout 19 on the bottom paper 105 is carried into the tunnel during the interval wherein it tends to leaven or foam up at a preselected rate so as to flow into the corners of the tunnel mold 210 and thus assume its proper shape and cellular form. When the foam has substantially filled the cross-section of the tunnel molde 210, it tends to catch the top paper 106 and then draw the top paper 106 with it through the tunnel mold 210.

It should be understood that the volume or amount of polyurethane foam being produced is a function of the size and density of the bun. However, these characteristics, although controllable, are dependent upon many factors besides the proportions of the various constituents combined in the mixing nozzle 18. For example, factors such as the ambient temperature of the system, the flow rate of mixture from the spout 19 to the bottom paper 105, and the velocity of the lower belt 115, are also important. The ambient temperature of the system cannot ordinarily be easily controlled, but the flow rate of mixture into the system and the velocity of the lower belt 115 can and should be correlated and regulated.

If the speed of the lower belt 115 is too fast, the foaming mixture will be carried through the tunnel 210 before the bun can be molded properly, and the resulting bun will not be rectangular. On the other hand, if the speed of belt 115 is too slow, the foam front of the rising mass will tend to back up in the tunnel mold 210 and roll back over fluid which has not yet begun to rise. In such a case, the resulting bun will contain irregularities and will obviously not be isotropic.

In addition, it is also desirable to adjust the system to keep the foam front as nearly flat as possible, since this will provide for foam at a constant rate, and since this will help provide for isotropicity of the resulting bun. Accordingly, the tunnel mold 210 may be selectively inclined at an angle such as to maintain a flat or substantially flat foam front, in correlation with the speed of the lower belt 115 through the tunnel mold 210, and these parameters must be correlated with the flow rate (and constituency) of the mixture deposited by the spout 19.

As will be apparent from a study of FIG. 2, the finished rectangular bun passes out of the exit end 224 of the tunnel mold 210, and onto the roller bars 251 of the transitional conveyor section 202. The conveyor belts 119 and 115 in the tunnel assembly 200 push the bun across the roller bars 250, and onto the saw conveyor belt 252 in the saw assembly 204. It is a function of the saw conveyor belt 252 to carry the finished bun under the saw blade 254, and thereafter to carry the severed billets away from the saw blade 254.

It should further be noted that the bottom conveyor belt 115 is disposed about a front roller 258 mounted ahead of the pouring spout 19, and a rear roller 260 mounted immediately below the rear roller 262 which supports the side conveyor belt 212. Roller 260 is driven by an electric motor 264, and rotation of roller 260 may be seen to apply rotary power to roller 262 by means of beveled gears 266. It should be further noted that the saw conveyor belt 252 is disposed about front and rear rollers 270 and 272. The saw conveyor belt 252 is driven by power applied to rear roller 272 through a suitable drive belt 274 which is connected to a suitable electric motor 276. It is preferable that belt 252 be rotated in synchronism with belts 256 and 212. Accordingly, motors 264 and 276 are preferably both controlled by the same control circuit 278.

It should be further noted that the saw 254 is mounted on a saw carriage 280 which operates to drive the saw blade 254 downward to sever each billet from the bun departing the tunnel mold 210 at its exit end 224. The saw blade 254 may be actuated downward by any suitable conventional means, such as by compressed air.

It should also be noted that the bun will continuously leave the exit end 224 of the tunnel, irrespective of the action of the saw blade 254. Accordingly, the saw carriage 280 preferably travels with the bun, as the saw blade 254 moves downwardly to cut off each billet. In this manner, the saw blade 254 will not impede movement of the bun out of the exit end 224 of the tunnel. Accordingly, the saw carriage 280 is preferably fitted with three rollers 282, 284 and 286, which permit the saw carriage 280 to move back and forth along the saw assembly 204 without impeding movement of the saw conveyor belt 252. More particularly, the belt 252 is disposed over rollers 282 and 286, and under roller 284, so that when saw blade 254 reaches the bottom of the bun it will not sever belt 252.

Upon completely severing the bun,, however, the saw blade 254 immediately rises to the top of the carriage 280 and the carriage 280 then travels backwards over the approaching bun towards the exit end 224 of the tunnel mold 210. When the saw carriage 280 reaches rollers 270, the saw blade 254 is again actuated to move downward to cut off the next billet. The severed billet is, in each case, carried away from the saw blade 254 and saw carriage 280 by the travel of belt 252 towards and over the rear roller 272.

Figure 3:
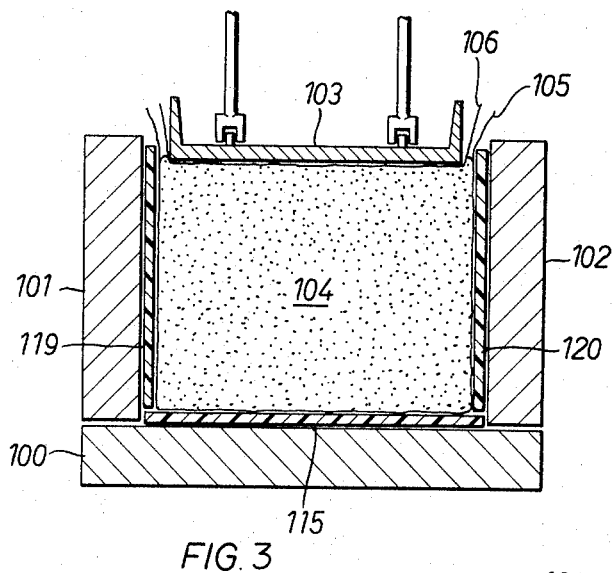
FIG. 3 is a pictorial representation, partly in cross-section, of a portion of the system depicted in FIG. 2.

Referring now to FIG. 3, there may be seen a cross-sectional representation, partly pictorial, of the main components of the tunnel 210 depicted generally in FIG. 2. In particular, there may be seen a functional representation of the bottom panel 100, the two side panels 101 and 102, and the top panel 103. As suggested in FIG. 3, the two side panels 101 and 102 are vertically positioned to define a rectangular cavity having preselected dimensions. Although side panels 101 and 102 are adjustably mounted relative to each other, they are rigidly positioned with respect to the bun 104 contained therebetween.

On the other hand, as suggested in FIG. 3, although the top panel 103 is adjustably positioned relative to the bottom panel 100, it is spring-loaded to be yieldably urged downward to a preselected extent to maintain homogeneity of the bun 104, and to prevent the cells therein from assuming a flattened shape. In order words, it is necessary that the top panel 103 compress the rising foam sufficient to require the foam to flow into the top corners of the tunnel mold 210, since this is what gives the bun a rectangular cross-section. It is also necessary that this compression be sufficient to cause the cells to be generally equally spaced throughout, since this aids in giving the resulting bun homogeneity. However, it is also necessary that the top panel 103 yield when the upward pressure exceeds a preselected set point, since this prevents flattening of the cells of the bun, and aids in giving the bun isotropicity. As may further be seen, the bottom paper 105 is disposed between the bun 104 and the bottom and side panels 100-102, in a generally U-shaped manner. The top paper 106 is disposed in a generally U-shaped manner about the top panel 103, so as to be urged down against the bun 104 by the top panel 103. Since the top paper 106 is substantially narrower than the bottom paper 105, the edges of the two papers will be substantially coincident.

It should be noted that there is a bottom conveyor belt 115 which is disposed about the top and bottom surfaces of the bottom panel 100 between the bottom panel 100 and the bottom paper 105. Further, there are side conveyor belts 119 and 120 which are disposed about the right and left surfaces of the side panels 101 and 102, between the side panels 101 and 102 and the bottom paper 105. As hereinbefore explained, these conveyor belts function to draw the bun 104 and bottom paper 105 through the tunnel, while the bun 104 itself acts to pull the top paper 106 along with it through the tunnel after the bun 104 achieves substantially its full cross-sectional shape, and adheres to the top paper 106.

Figure 4:
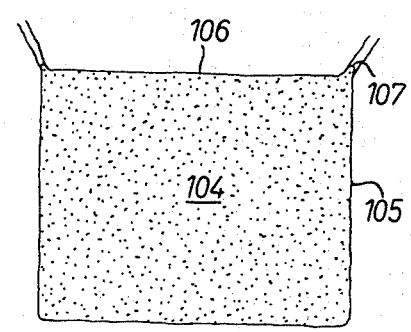
FIG. 4 is a pictorial representation of an end view of an isotropic polyurethane billet of the type produced by means of the present invention.

Referring now to FIG. 4, there may be seen a pictorial representation of a bun 104 having a substantially rectangular cross-section. It can be further seen how the top and bottom papers 106 and 105 are fixed tightly to the bun 104, except at the upper corners. This is due to the fact that the top panel 103 is substantially narrower than the space between the two side panels 101 and 102, and that the bottom paper 105 tends to lie flat against the side panels 101 and 102 while the top paper 106 tends to lie flat against the sides of the top panel 103. Thus, the portions of the bun 104 between the gaps between the top panel 103 and the side panels 101 and 102 tend to rise slightly above the bottom surface of the top panel 103 to form "rabbit ears" 107. The height of these rabbit ears can be observed from a position above the tunnel and indicates to experienced operating personnel the condition of the bun 104 along the length of the tunnel. It should further be noted that the papers 105 and 106, being fixed to the surfaces of the bun 104, tend to aid in the "curing" process even after the bun 104 has been removed from the tunnel and has been cut into billets and stored.

Figure 5:
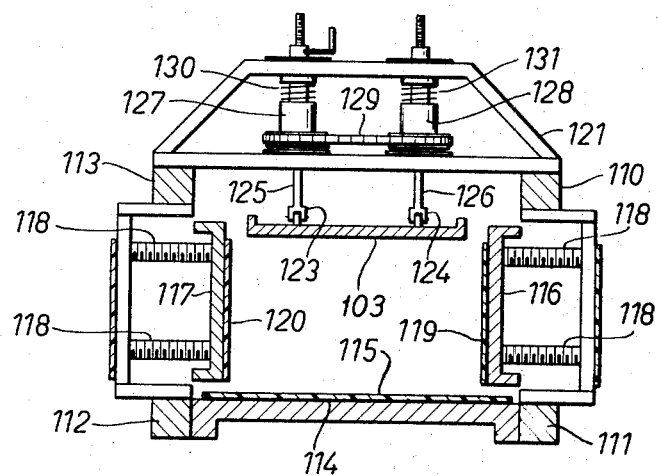
FIG. 5 is a pictorial representation of another portion of the system employed to produce polyurethane bun by means of the present invention.

Referring now to FIG. 5, there may be seen a more detailed representation of the portion of the tunnel generally depicted in FIG. 3. In particular, there is shown in cross-sectional view four longitudinally arranged struts 110-113, with the bottom panel 114 disposed between the two lower struts 111 and 112 by suitable means not depicted. As hereinbefore stated, the bottom conveyor belt 115 is arranged immediately about the bottom panel 114.

Also disposed immediately above the bottom panel 114 and the bottom conveyor belt 115 may be seen the side panel assemblies 116 and 117, which are adjustably but rigidly positioned by means of worm gears 118 to define the vertical sides of the tunnel. Two side conveyor belts 119 and 120 are seen located immediately adjacent and about their respective side panels 116 and 117.

Disposed across the tops of the two top struts 110 and 113 is a truss-like frame 121 for supporting the top panel 103 to provide the top of the tunnel. More particularly, the top panel 103 may be seen to be connected by knuckle joints 123, 124 to support rodds 125, 126 which are threadedly interconnected with cylinders 127 and 128. As may further be seen, cylinders 127 and 128 are preferably linked together by an endless sprocket chain 129 so that rotation of cylinder 127 will also rotate cylinder 128 to the same extent, to provide that top panel 122 wil be held in a horizontal position irrespective of its vertical position.

Also disposed about support rods 125 and 126 and above cylinders 127 and 128, are springs 130 and 131 to urge cylinders 127 and 128 (and therefore shafts 125 and 126) downwardly towards the tunnel. Accordingly, this arrangement provides that the top panel 122 will be spring-loaded downward towards the bottom conveyor belt 115 as hereinbefore described.

Figure 6:
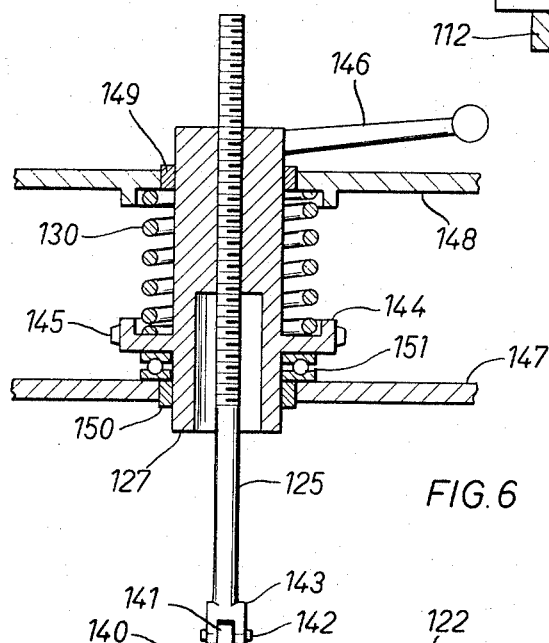
FIG. 6 is a pictorial representation, partly in cross-section, of certain details of the apparatus depicted in FIG. 5.

Referring now to FIG. 6, there may be seen a pictorial representation, partly in cross-section of a portion of the apparatus depicted in FIG. 5. In particular, the top panel 103 may be seen to be connected to a plate 140 having an eye projection 141 containing pin 142. The threaded support rod 125 depicted in FIG. 5, may be seen to be provided with a forked end 143 having a borehole fitting about pin 142, to thus provide the knuckle joint 123 depicted in FIG. 5. The threaded cylinder 127 may be further seen to be provided with flange 144 having sprocket teeth 145 for engaging chain 129 depicted in FIG. 5. Cylinder 127 may also be seen to be provided with a crank handle 146 for rotating cylinders 127 and 128 (see FIG. 5).

As hereinbefore stated with respect to FIG. 5, the top panel 103 is generally supported by a truss-like brace 121. This truss-like brace may be seen in FIG. 6 to be composed of a bottom strut 147 and an upper strut 148. Cylinder 127 is disposed through apertures in both the upper and lower struts 148 and 148, and rotatably mounted therein by means of bushings 149 and 150. A thrust bearing 151 is preferably provided to further support cylinder 127 by being disposed between the lower strut 147 and the flange 144 to facilitate rotation of the cylinder 127. As further may be seen in FIG. 6, spring 130 is disposed about cylinder 127, and between the upper strut 148 and the upper surface of flange 144, to resist upward movement of the top panel 103 of the tunnel.

Figure 7:
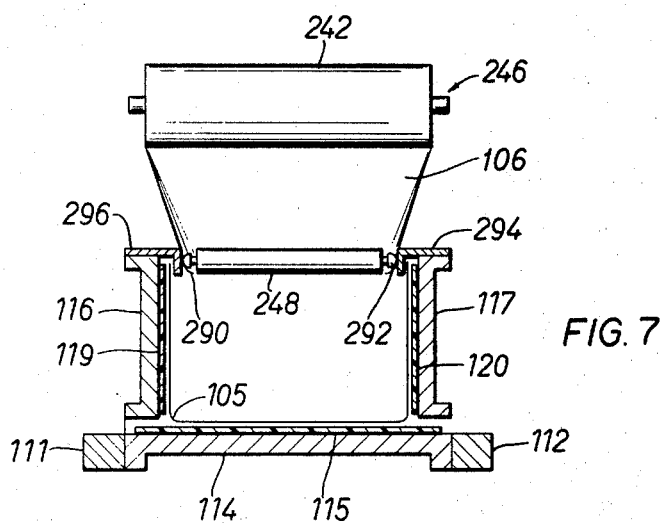
FIG. 7 is a pictorial representation, partly in cross-section, of another portion of the apparatus depicted in FIG. 2.

Referring now to FIG. 7, there may be seen a pictorial representation, partly in cross-section, of the entrance 250 of the tunnel. More particularly, FIG. 7 shows the bottom longitudinal struts 111 and 112, and the bottom panel 114, previously depicted in FIG. 3. In addition, the two side panels 116 and 117 may be seen disposed adjacent the right and left side conveyor belts 119 and 120, and U-shaped bottom paper 101, which is depicted in FIG. 5, and the roll 242 of the top paper 106 previously depicted in FIG. 2.

As may be further seen, a creasing roller 248, having a rounded or hemispherical creasing knob 290 and 292 at each end, is located below roller 246 to receive the top paper 244 from the roll 242. Accordingly, the top paper 244 is arranged to pass between the creasing knobs 290 and 292 and the closely adjacent creasing plates 294 and 296 which are each spaced from one of the knobs 290 and 292 a preselected distance. The top paper 106 passes over each knob 290 and 292, which act to hold up the edges of the top paper 106 and thus cause it to assume a U-shape as it passes into the tunnel. The U-shaped top paper 106 thereafter continues through the tunnel but pressed up and around the bottom and sides of the various top panels 103 depicted in FIG. 2, as previously shown in detail in FIGS. 3 and 4.

Figure 8:
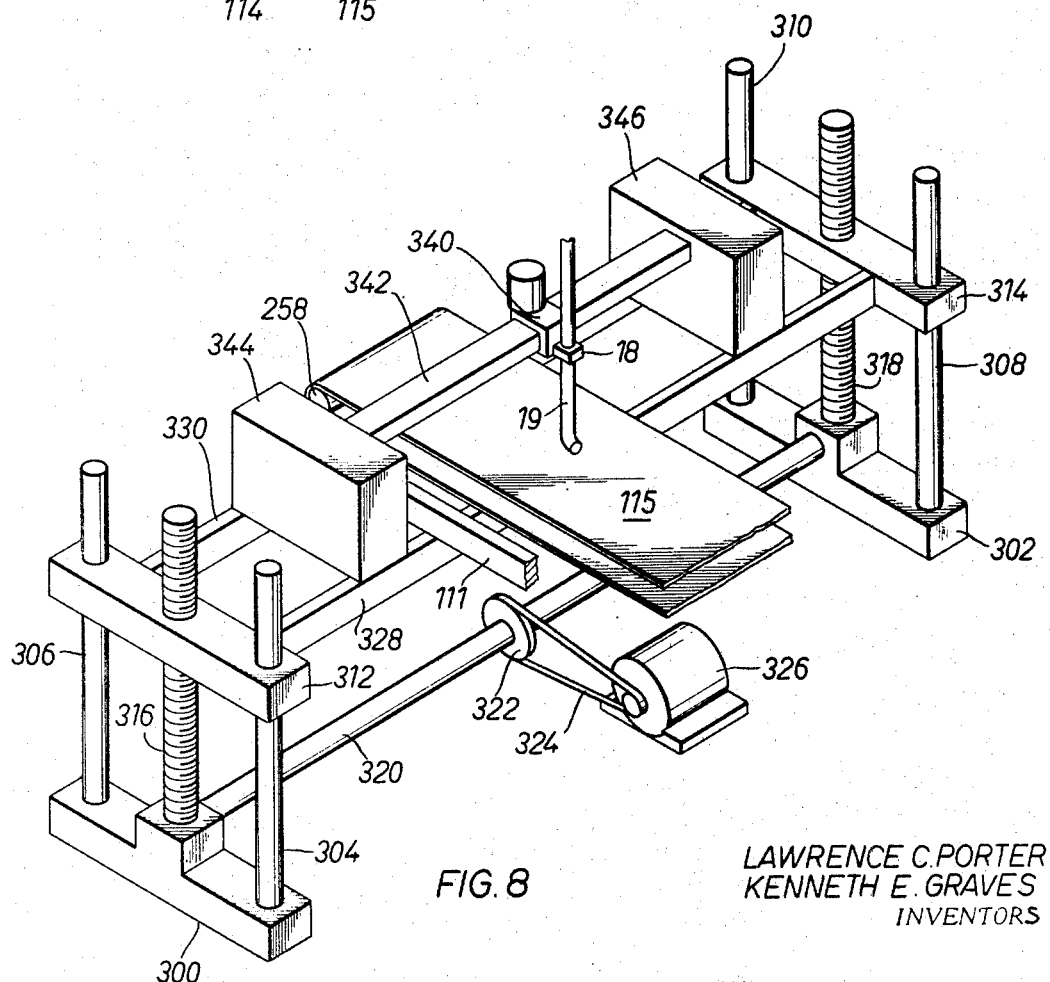
FIG. 8 is a functional representation, partly pictorial, of another portion of the apparatus generally depicted in FIG. 2.

Referring now to FIG. 8, there may be seen a pictorial representation of the functional details of that portion of the apparatus which permits the inclination of the tunnel to be varied selectively, while maintaining a preselected spacing between the bottom conveyor belt of the tunnel and the pouring spout of the mixing nozzle hereinbefore described. More particularly, a support frame may be seen to be provided for the purpose of supporting the entrance end of the tunnel, which support frame includes bases 300 and 302, each having two vertical guide rods 304, 306, 308 and 310 and a pair of brackets 312 and 314 which are slidably disposed about each pair of guide rods 304 to 310. A pair of worm gears 316 and 318 are disposed in bases 300 and 302, and threadably through brackets 312 and 314, to raise or lower brackets 312 and 314 by virtue of their own rotation. Worm gears 316 and 318 are rotated by a drive shaft 320 which is rotated by a drive wheel 322 linked by a belt 324 to drive motor 326. Motor 326 may be selectively rotatable in either direction, by conventional control means not depicted.

A further depicted in FIG. 8, rackets 312 and 314 may be seen to be connected by a pair of lateral struts 328 and 330 which support the lower longitudinal struts of the tunnel mechanism, depicted in FIGS. 2, 5 and 7, and represented in FIG. 8 by strut 111. Thus, actuation of motor 326 will turn worm gears 316 and 318 to raise or lower the tunnel depending upon the direction of rotation of motor 326.

It will be noted that the spout 19 depicted in FIGS. 2 and 8 is bent in an angular manner relative to the bottom paper 105 and lower conveyor belt 115. The particular angle of bend of the spout 19 is not a critical factor in the depicted process. However, at least some angle is necessary to prevent the fluid being discharged from pouring down upon the bottom paper 105 so as to spatter or to trap air, since trapped air bubbles in the fluid on the bottom paper 105 will cause undesirable cavitation in the resulting bun.

Moreover, it is important that the spacing between the tip of the spout 19 and the bottom paper 105 be preselected so that spattering and air entrapment will be substantially eliminated. As hereinbefore stated, it may be desirable to vary the inclination angle of the tunnel 210. However, as will be hereinafter discusssed in detail, it is preferable to maintain the spacing between the spout 19 and the bottom paper 105 during any variation of the inclination angle of the tunnel 210, although it is immaterial whether or not the angular relationship of the spout 19 tip is maintained (provided the tip is kept at some minimum angle thereto). The particular spacing between the spout 19 and the bottom paper 105 is governed largely by the viscosity and the flow rate of the fluid being discharged from the spout 19.

As hereinbefore stated, it is necessary to maintain a fixed spacing between the pouring spout 19 and the bottom conveyor belt 115. This is achieved by mounting the mixing nozzle 18 on a traverse cradle 340 which longitudinally slides back and forth along traverse rail 342 disposed between rail holders 344 and 346 mounted on the aforementioned lateral struts 328 and 330. Suitable drive mechanism (not depicted) may be provided to drive the cradle 340 back and forth along the traverse rail 342, and across the width of the tunnel, to spread the mixture in the U-shaped bottom paper (not depicted) located on the bottom belt 115. Since the mixing nozzle 18 and pouring spout 19 are unitarily combined with the lateral strut 328 and 330, raising and lowering the tunnel will also raise and lower the mixing nozzle 18 and pouring spout 19 and thus maintain a fixed spacing between the top of the spout 19 and the bottom conveyor belt 115, irrespective of the inclination of the tunnel.

CONTROLLER

As hereinbefore stated, it is a feature of the invention to provide means and techniques for measuring selected controllable parameters of the system, to compare these measurements on the basis of a pre-established or preselected relationship and to continually adjust either selected ones of these parameters so as to maintain the preselected relationship, or else to select an alternative relationship and to adjust one or more parameters accordingly. Although the fluid flow measuring and control circuits and components hereinafter described are ideally suitable for manual use as well as with a suitable controller of the type hereinafter described, for the sake of convenience they will be discussed in connection with and as though they are an integral part of the controller section of the present invention.

Referring now to FIGS. 9A and 9B, there may be seen a functional representation of a signalling and controlling system adapted to be interconnected with either a manually operated control and observation center (not depicted), or with a controller system of the type hereinafter described. In either case, it will be noted that it is a feature of the structures illustrated in FIGS. 9A and 9B that all indications derived and forwarded to either the controller system or the manual control center are expressed in terms of mass transfer units of the ingredients being combined in the mixing nozzle 18.

In particular, there may be provided a series of positive displacement gear pumps 30–36 and 132–135 for transferring resin. PAPI, silicone, both catalysts, castor oil, coloring, phosphoric acid and fire retardant, from Tanks Nos. 1–5 and 7–10 to the line blender 11 and mixing nozzle 18, as previously represented in FIG. 1, and a high-pressure turbine pump 37 for transferring Freon between tank 6 and the mixing nozzle 18. Pumps 30–36 and 132–135 may be driven through gear boxes 50–56 and 136A–139A by D.C. motors 40–46 and 136–139, respectively, which are preferably controlled from either a central control location or point (not depicted) as hereinbefore stated, or by the aforementioned controller. The regenerative turbine pump 37 is preferably driven by an A.C. motor 47 which may be operated at a constant speed.

It will be apparent that rotation of the shaft in a positive displacement pump 30 may not be exactly linearly proportional to the mass transfer units provided by the pump 30. Accordingly, the output shaft from the gear box 50 may be connected to a variable ratio speed changer 38, as well as to pump 30. It is the function of the variable ratio speed changer 38 to provide output shaft rotation for driving a suitable electrical pulse generator 48 to thus produce electric pulses directly related to the number of mass transfer units delivered by the resin pump 30. As depicted in FIG. 9A, these electrical pulses are transmitted by conductor 50A to either the aforementioned manual control center or controller, where resin transfer can be continuously observed and recorded. If it is desired to adjust the rate of resin transfer, the speed of pump 30 can be conveniently adjusted by means of a suitable electrical control signal or voltage transmitted to a conventional control on the D.C. motor 40 by way of conductor 40A.

As may also be seen, transfer of PAPI in line 13 (hereinafter called PAPI-A), is monitored and controlled in the same manner as provided for resin from Tank 1. The D.C. motor 41, which is controlled by an electrical signal in conductor 41A, drives pump 31 by means of gear box 51. The output from gear box 51 is also connected to drive another variable ratio speed changer 39 which in turn drives a suitable electrical pulse generator 49 to produce electrical pulses directly coincident with and indicative of the units of PAPI-A being transfered through line 13 and to line 16. These pulses are transmitted by way of conductor 31A to the aforementioned indicator board for observation and recording.

As may further be seen in FIGS. 9A and 9B, pumps 32-36 and 132-135 are similarly driven by D.C. motors 42-46 through gear boxes 52-56 and 136A-139A. However, it should be noted that the quantities of fluid being transferred by these pumps are relatively small, and thus the output shafts of gear boxes 52-56 and 136A-139A rotate too slowly to cause their associated variable ratio speed changers 60-64 and 76-79 to produce angular velocities sufficient for these purposes. Accordingly, speed changers 60-64 and 76-79 are preferably connected to the armatures of motors 42-46 and 136-139, respectively, rather than to their associated pulse generators 65-69 and 76A-79A, respectively, to produce accurate signals in conductors 32A-36A, 88A-89A and 98A-99A, as hereinbefore described. Motors 42-46 and 136-139 may be controlled by suitable electrical signals received by way of conductors 42A-46A, 88-89 and 98-99, respectively.

It should therefore be noted that the pulse rates produced by the various pulse generators 48, 49, 65-69 and 76A-79A do not necessarily all represent identical mass transfer rate levels. In other words, the speed changers 38-39, 60-64 and 76-79 determine what the output rates of the pulse generators 48-49, 65-69 and 76A-79A shall represent, assuming that all pulse generators 48-49, 65-69 and 76A-79A are of the same type of component being preselected for desired rate level. Thus, each pulse in conductor 50A may represent one one-hundredth of a pound per minute of resin, whereas each pulse in conductor 32A may represent one ten-thousandth of a pound per minute of silicone.

Referring now to the Freon transfer system depicted in FIG. 9B, there may be seen that the turbine pump 37 delivers Freon from Tank 6 to a pressure relief valve 70 which is connected to deliver Freon either to a turbine flow meter 71, or back to Tank 6, to establish a preselected fixed line pressure therefrom irrespective of variations in flow rate. The fluid through the turbine flow meter 71 is passed to flow regulator 72 which is controlled by a servo motor 73. The turbine flow meter 71 is also connected to generate electrical pulses directly indicative of Freon volume, and to apply these pulses to the input of an adjustable frequency-to-voltage integrator circuit 74. The sealed output voltage generated by the integrator 74 is preferably applied to a suitable voltage-to-frequency converter 75, which sends to the indicator board, by way of conductor 75A, pulses which are directly indicative of the mass transfer rate of Freon delivered through the flow regulator 72 to the mixing nozzle 18. Freon flow to the mixing nozzle 18 may be controlled by a suitable control signal, from the remote control center, sent to the servo motor 73 by way of conductor 73A.

Referring now to FIG. 10, there may be seen a functional representation of a further portion of the flow system generally depicted in FIG. 1, wherein provision is made for recirculating the various ingredients depicted in FIG. 1, in order to stabilize the temperature of the fluids and the flow rates of the subsystems before passing the fluids into the mixing nozzle 18. In particular, three-way valves 80-87 and 152-155 are interconnected between pumps 30-36 and 132-135, and the flow regulator 72, and lines 7, 13, 9, 8, 14, 10, 15, 160-163 and 17, respectively. The three-way valve 80-87 and 152-155 may be controlled by solenoid-operated rotary actuators 90-97 and 156-159 which, in turn, may be actuated by suitable electrical signals from either the remote manual control point or the controller, as hereinbefore mentioned.

Accordingly, valve 80 may be positioned to route resin either to line 8 or back to the resin supply 1 in Tank No. 1. The other valves 81-87 and 152-155 may be similarly controlled and positioned.

As further shown in FIG. 10, the line blender 11 depicted generally in FIG. 1 is preferably composed of a manifold 11A and a premixer 11B. Lines 7-10 and 160-163 are connected to the manifold 11A which is directly connected to the premixer 11B. The output from the premixer 11B is connected to the mixing nozzle 18 by way of line 12.

As hereinbefore stated, valves 81, 84, and 86 are connected to lines 13-15, respectively, which are connected to a manifold 16A not specifically depicted in FIG. 1. The output of the manifold 16A is connected to the mixing nozzle 18 depicted in FIG. 1 by way of line 16. Valve 87 is connected directly to the mixing nozzle 18 by way of line 17.

It is desirable to calibrate the pulses produced by pulse generators 48-49, 65-69 and 76A-79A, and by the converter 75, against known amounts of mass transfer. Accordingly, the pulses produced by each such pulse generator may be connected to or include a suitable scaler device which is adjusted to deliver pulses having a known relationship to the amount of mass transfer produced. In other words, it would be known that each revolution of the pump shaft would deliver so many mass transfer units, irrespective of how many electrical pulses may be produced by its associated pulse generator. Accordingly, the associated scaler device should be adjusted to deliver a proportional number of pulses for each unit of mass transfer being delivered by the pump during each pump shaft revolution.

Referring now to FIGS. 11A and 11B, there may be seen a functional representation of an alternative form of the structures depicted in FIGS. 9A and 9B, wherein the various D.C. motors 40-46 and 136-139 are connected to gear boxes 165-174, respectively, by means of shafts having spur gears 175-185 mounted concentrically thereon. Each of the spur gears 175-185 are preferably provided with sixty teeth of equal width and spacing, and each such tooth may be tipped with a magnetic material. Accordingly, magnetic sensors or pickups 186-196 are preferably spaced close to gears 175-185 so as to generate a discrete signal, such as a voltage pulse, each time a tooth moves in and out of proximity to one of the pick-ups 186-196.

It will be apparent that use of the magnetic pick-ups 186-196 eliminates the need for the pulse generators 48-49, 65-69, and 76A-79A, as well as variable ratio speed controllers 38-39, 60-69 and 76-79, which are illustrated in FIGS. 9A-9B. However, the magnetic pulses represent motor r.p.m. rather than rates of mass transfer and thus these pulses are preferably applied to frequency-to-frequency converters 197-199, 25-29, and 57-59, which provide output signals on conductors 362-372 which are composed of pulses which represent the discrete mass transfer rate of fluid through the pumps to which each of the magnetic pickups is attached.

As may be seen the Freon control circuitry illustrated in FIG. 11B may be arranged the same as depicted in FIG. 9B. Referring now to FIG. 12A, there may be seen an alternative form of Freon control circuitry which is particularly suitable for use with a controller of the type hereafter described, although such a circuitry may also be employed with a manually controlled system. In particular, there may be seen a functional representation of Tank No. 6 containing the Freon supply 6 and having an output line with a suitable filter 288 coupled to the input of a regenerative turbine pump 297. The output of the pump 297 is connected to a three-way valve 298, as well as back into Tank No. 6. A suitable back-pressure regulator 289 is preferably included in the discharge line from the pump 297, with a bypass return to Tank No. 6, so that a predetermined fixed line pressure may be maintained irrespective of flow rate fluctuations.

When it is desired to shut down the production of polyurethane foam for an extended period, then the three-way valve 298 will preferably be positioned so as to conduct Freon supplied to it by the pump 297 directly back to Tank No. 6 instead of through the turbine flow meter 71 and the Kates flow regulator 348 (operated by a servo motor 73) to an input port of the three-way valve 87 as previously illustrated in FIG. 10.

The rate of Freon flow through the valve 87, and through line 17 to the mixing nozzle 18 (see FIG. 1), will be controlled by the Kates flow regulator 348, and thus the servo motor 73 will receive its control signals from the controller by way of conductor 361. The turbine flow meter 71 provides a direct indication of the rate of Freon transfer to the mixing nozzle 18, and this indication is preferably applied to a frequency-to-frequency converter 347 before being passed to the controller by way of conductor 373.

Referring now to FIG. 12B, there may be seen an alternative form of flow control structure which is particularly suitable for those portions of the system handling relatively large fluid volumes, such as the resin control system, but which may be beneficially substituted for any of the other systems. Accordingly, the D.C. motor 40, the gear box 164, and the resin pump 30, may all be seen to be arranged substantially as illustrated in FIG. 11A. However, a positive displacement flow meter 412 may be connected in the flow line from the pump 30 to the three-way valve 80 depicted in FIG. 10, and the spur gear 413 may be seen to be rotated by a shaft intercoupled with the flow meter 412. A pickup 414, and frequency-to-frequency converter 197 having its output connected to the controller by conductor 362, may be provided as hereinbefore described. The control signals from the controller are supplied to the D.C. motor 40 by way of conductor 350.

The advantages of the structure illustrated in FIG. 12B derive from the fact that the measurement of mass transfer is taken from a flow meter rather than from either the pump 30, the motor 40 or the gear box 164, as is the case with the structures illustrated in FIGS. 9A and 9B and FIGS. 11A and 11B. In all cases, the illustrated pumps are assumed to have pumping characteristics which are substantially linear—at least within pre-established limits. This assumption is usually entirely justified, of course, when the pumping equipment is new or relatively new or when the fluids being pumped are of at least a minimum viscosity.

It is undesirable, however, to replace an expensive pump which is still capable of delivering fluid in a satisfactory manner except that its pumping characteristics are no longer substantially linear throughout broad limits. Moreover, changes in the linearity of the pump occur gradually and not always predictably. However, if the output signals from the pulse generators or the magnetic pickups are generated in a substantially non-linear manner, it will be obvious that the production system cannot be properly controlled by a controller which operates in an extremely linear manner.

In the structure depicted in FIG. 12B, it will be seen that the measurement is derived from the flow meter 412, rather than from the other components heretofore mentioned. The linearity of the flow meter 412 is not affected in any manner by changes in the linearity of the pump 30 or the other components, and thus the structure depicted in FIG. 12B is inherently capable of deriving more precise measurements.

Referring now to FIGS. 13A and 13B, there may be seen additional circuitry which is intended to couple the various measurement and control signals to and from the controller and the flow control components hereinbefore described. The illustrated system is entirely compatible with any of the alternative forms depicted in FIGS. 11A and 11B.

Accordingly, conductors 350–360, which apply control signals to the D.C. motors 40–46 and 136–139, as illustrated in FIGS. 11A and 11B, may be seen to derive these control signals from SCR controllers 374–384 which, in turn, are driven by ten-turn control potentiometers 386–396, respectively. Conductor 361 which applies Freon control signals to the servo motor 73 in FIGS. 9B, 11B and 12A, may be seen to receive these Freon control signals from a suitable servo amplifier 385 which, in turn, is driven by the ten-turn control potentiometer 397. The various control potentiometers 386–397, in turn, may be seen to be respectively actuated by bi-directional stepper motors 400–411 which, in turn, receive their respective control or input signals from a controller, as will hereinafter be described. Alternatively, the input control signals applied to the stepper motors 400–411 may be derived from manually operated switches or other control components (not depicted), or the ten-turn control potentiometers 386–397 may be manually adjusted if it is desired to use the structure illustrated in FIGS. 13A and 13B with a manually operated foam production system.

Referring now to FIG. 14, there may be seen a functional representation of a controller suitable for incorporation with the structures hereinbefore described and depicted, and adapted to attain the objects and features of the present invention. In particular, there may be seen conductors 362–373 arranged to deliver the various flow measurements (resin, PAPI–A, etc.) to a scanner 420 which, in turn, delivers corresponding output signals though conductors 422–433 to a suitable gating network. As will hereinafter be explained, it is the function of the scanner 420 to repetitively examine the input signals in conductors 362–373 in a cyclic fashion (beginning with the resin signal and proceeding in the order in which the inputs are illustrated) and to generate a corresponding output pulse to the gating network 441 for each input pulse received.

As may be seen, a period generator or "clock" 434 is interconnected with the gating network 441 to generate actuating pulses of a preselected duration, and a step register or counter 435 is connected to the gating network 441, whereby the inputs in conductors 422–433 may each be sampled in combinations suitable for determining mass transfer rate or ratio errors. The output signals from the gating network 441 are transmitted through a plurality of different circuits, which are functionally represented in FIG. 14 as conductors 447–449, to a stepper driver selector 442, an error counter 445, and presets 450–462.

The presets 450–462, in turn, may be seen to be connected to a comparator 440, which is connected to receive input signals from a ratio counter 439, and which delivers output signals to a pulse coincidence comparator 446. It may be noted that the step counter 435 also applies output signals to the ratio counter 439, a period length select circuit 438, a multiplier circuit 443, and to a bandpass selector 444. The period length select circuit 438 is connected to actuate a period length gating circuit 437 which, in conjunction with a conventional period counter 436, delivers an actuating signal to the pulse coincidence comparator 446.

The error counter 445 may be seen to be responsive to an output from a band pass selector 444 and to signals received from the gating network 441 by way of conductor 448, as will hereinafter be explained. It is a function of the error counter 445, as will also be hereinafter explained, to derive an output which is a function of the magnitude of any error or difference between the measurement of a selected flow parameter as received in conductors 362–373, and the appropriate preselected parameter as provided by the corresponding one of the various presets 450–462. Accordingly, the computed error (if large enough) is passed through the multiplier 443 to the stepper driver selector 442 (which is selectively actuated by a signal from the gating network 441), to cause the appropriate one of said stepper drivers 463–474 to adjust the corresponding appropriate one of said bi-directional stepper motors 400–411 depicted in FIGS 13A and 13B.

Referring now to FIGS. 15A and 15B, there may be seen a more detailed functional representation of a suitable embodiment of the scanner circuit 420 indicated generally in FIG. 14. It is the function of the scanner circuit 420 illustrated in FIG. 14 to receive pulses which are random, asynchronous, and often coincident, from input conductors 362–372 and to convert or translate such pulses into a train of pulses synchronous with the system and separate in time. Accordingly, in FIGS. 15A and 15B, there may be seen an array of twelve or more D.C. latch circuits, which are hereinafter referred to as No. 1 holding registers 480–491, and which are connected to conductors 362–373, respectively, to receive the aforementioned random, asynchronous, and often coincident pulses. In addition, the No. 1 holding registers 480–491 may be also seen to generate output signals 516–527 to a secondary array of D.C. latch circuits hereinafter called No. 2 holding registers 492–503, respectively.

The output signals 528–539 from the No. 2 holding registers, respectively, may be seen to be each applied as a reset signal to the corresponding ones of the No. 1 holding registers 480–491, respectively, as well as to the input terminals of corresponding ones of an array of output registers 504–515, respectively, as illustrated in FIG. 15. Each of the output registers 504–515, which are each preferably composed of a bistable multivibrator circuit with an inhibitor circuit in the input portion, delivers their respective output signals into conductors 422–433 leading to the gating network 441 depicted in FIG. 14.

As may be seen, each of the No. 1 holding registers 480–491 is adapted to be reset by appropriate ones of the output signals 528–539 from the No. 2 holding registers 492–503. Similarly, the No. 2 holding registers 492–503 are adapted to be reset by the corresponding output signals from respective ones of the output registers 504–515. Each of the No. 2 holding registers 492–503 is further adapted to function as AND circuits and is connected to receive output signals 476 from a strobe generator 475 as well as the output signal from the corresponding one of the No. 1 holding registers 480–491. For example, the resin No. 1 holding register 480 receives and accumulates pulses continuously from conductor 362. When the resin No. 1 holding register 480 receives a pulse from conductor 362, this pulse is held and is not transferred to the resin No. 2 holding register 492 until the next succeeding strobe signal 476 arrives from the strobe generator 475. In addition, output signal 528 is applied as a reset signal to the resin No. 1 holding register 480 and as an inhibiting signal to each of the other output registers 505–515 and as an inhibiting signal to the strobe generator 475, which responds only to the receipt of a clock output signal 477 during the absence of any of the signals 528–539 from the No. 2 holding registers 492–503.

Each of the output registers 505–515, other than the resin output register 504, may be seen to be provided with inhibitor circuitry as well as being adapted to function as AND circuits with respect to the output signal 477 from the clock 434 and the corresponding ones of the output signals 528–539 from the No. 2 output registers 492–503. In the case of the resin output register 504, only the clock output signal 477 and the output signal 528 from the resin No. 2 holding register 492 are received. When both such inputs are received, however, the resin output register 504 will generate an output in conductor 422 which also resets the resin No. 2 holding register 492.

The output signal 528 from the resin No. 2 holding register 492 functions as a NOT signal to each of the other output registers 505–515 and the strobe generator 475, as hereinbefore mentioned, for the purpose of blocking these circuits during the interval wherein resin transfer is being measured and applied to the controller circuit represented in FIG. 14. Similarly, the output signal 529 acts as a NOT signal to output registers 506–515, signal 530 as a NOT signal to output registers 507–515, and so forth, as may be seen in FIGS. 15A and 15B. On the other hand, as may further be seen, the strobe generator 475 operates only when all of the No. 2 holding registers 492–503 have been cleared. Thus, when the strobe generator 475 "fires," it simultaneously loads each of the No. 2 holding registers 492–503 with any new signal which may have been received in the corresponding ones of the No. 1 holding registers 480–491 during the time following the previous pulse generated by the strobe generator 475.

Thus, it may be seen that the various input mass flow measurements arriving in conductors 362–373 may be cyclically and continuously sampled, one after another, and that these samples are transferred by the scanner circuit 420 to the balance of the controller system or section as illustrated in FIG. 14. Each of the No. 1 holding registers 480–491 may include a Schmitt trigger as a portion of its input circuitry, since it is convenient that the input signals arriving in conductors 362–373 be reshaped into substantially "square" or rectangular pulses whereby the leading edges of such pulses may be easily handled.

It is especially desirable that the scanner circuit 420 be capable of accepting a pulse into any of the No. 1 holding registers 480–491, and also clearing such pulse through such register before the next succeeding pulse is received by that register, or else the succeeding pulse will be lost from the measurement sought to be made. In other words, for a given clock rate, there is always an inherent maximum or upper frequency limit which must be applied to the input signals appearing in conductors 362–373. Conversely, there is also a minimum clock frequency above which none of the pulses arriving in conductors 362–373 at less than the aforementioned maximum input frequency will be lost. Accordingly, the minimum clock frequency may, for purposes of the present invention, be defined as twice the sum of the maximum input frequency. Thus, if it is assumed there are twelve input circuits to the scanner circuit 420 as illustrated (see conductors 362–373), and if it is further assumed that eight of these inputs have preselected maximum frequencits of 50 kilocycles, three have preselected maximums of 80 kilocycles, and that one has a limit of 20 kilocycles, the minimum acceptable clock frequency may be seen to be 1.32 megacycles.

It is essentially the function of the controller circuitry represented in FIG. 14 to derive a comparison between the desired input of each ingredient and the actual input, and to adjust the system so as to match the preselected formulation. In a useful embodiment of the controller circuitry, the system may be adapted to derive and utilize control signals representing the respective ratios of the actual input of each ingredient to the preselected input or throughput of such ingredients, and to thereafter adjust each such input to match he preselected input.

However, the isotropicity of the foam is the most important of all of the characteristics, and thus it is particularly desirable to maintain the formulation and to adjust or manipulate the total or gross material throughput to maintain the isotropicity of the foam product during the operation of the system represented generally herein. Accordingly, the controller circuitry depicted in FIG. 14 is preferably adapted to receive preset values each representing the ratio of each ingredient to a preselected one ingredient (preferably resin), and thus to derive and compare the actual ratio of each ingredient to resin with the preset or preselected ratio. Thus, the controller circuitry will operate to maintain the desired formulation or proportionality within closer tolerances to maintain optimum isotropicity, whereby total throughput can be adjusted without interruption of productivity.

Accordingly, it is a function of the step counter 435 to repetitively derive an appropriate number of stepping signals (for example, sixteen), in a cyclic manner, for the purpose of causing the gating network 441 to accept and derive the ratios of selected ones of the input signals 422–433. For example, step one will derive the actual ratio of PAPI-A-to-resin input, step two will derive the actual ratio of silicone-to-resin input, step three will derive the actual ratio of catalyst No. 1-to-resin, and so forth through a sequence of nine of the sixteen steps.

In each of these first nine steps, the gating network 441 transmits a signal (not shown in FIG. 14) representing the actual resin input to period counter 436, and a signal (not shown in FIG. 14) representing the actual input of the selected ingredient to the ratio counter 439. The period counter 436, in turn, delivers a signal to the comparator circuit 440 representing the base number of the ratio of the selected ingredient to resin. Thus the period counter 436 will transmit a control pulse to the comparator 440, coincident with the acquisition of (for example) 1000 "resin" pulses in the period counter 436.

In addition, the gating network 441 also actuates the appropriate one of the presets 450–462 which, in turn, also applies a signal to the comparator 440 representing the preselected ratio of the input of the selected ingredient to resin input. The comparator 440 then transmits an output signal representing the comparison of these two ratio signals to the pulse coincidence comparator 446.

As may be seen in FIG. 14, it is necessary to obtain close synchronization of the various signals so as not to omit any pulses, and so that the periods of the signals are the same. Accordingly, the step counter 435 may be seen to actuate a period select circuit 438 and a bandpass selector 444 at the same time it actuates the gating network 441 and the ratio counter 439. The period select circuit 438 actuates the period length gates 437 which, in conjunction with the period counter 436, controls the pulse coincidence comparator 446, as will hereinafter be explained.

The pulse coincidence comparator 446, which is also controlled by the clock 434, transmits a signal to the error counter 445 which is representative of the difference or error (and the direction of such error) between the actual and the preselected ratios of the selected ingredient input to resin input, and the error counter 445, in turn, generates an output representative of the magnitude of the error. The band pass selector circuit 444 is preferably included, as may be seen, to limit any error output to those of at least a minimum magnitude, so as to keep the system from responding to mere statistical differences and to keep "hunting" to a minimum.

The error signals from the error counter 445 are preferably passed through a multiplier 443, which will hereinafter be explained and described in detail, to a stepper driver selector circuit 442 which is also controlled by the step counter 435 through the gating network 441. The stepper driver selector 442, in turn, selects the appropriate one of the stepper drivers 463–474 and actuates it in a manner to appropriately adjust or position the appropriate one of the bi-directional stepper motors 400–411 represented in FIGS. 13A and 13B.

Referring again to FIG. 14, it may be seen that a resin preset 450 has been provided nothwithstanding that the ratio of resin-to-resin in both the actual material throughput and the selected formulation will always be unity and thus meaningless for control purposes. It is often desirable to include graphic recording equipment with equipment of this character, however, and in such instances it is useful to record resin as well as the other ingredients so that the record will not be confusing. Alternatively, in those forms of the controller circuitry wherein the comparator 440 is connected to receive and to compare actual and preselected mass transfer rates, the presets 450–462 will be adjusted or set to deliver signals representing preselected transfer rates rather than ratios, and in such a case the resin preset 450 is an essential component. It should be understood, however, that foam systems of the type represented herein are required to be operated by relatively unskilled or only semi-skilled personnel. Hence, the values actually turned into the presets 450–462 are preferably the preselected ratios of the input of each ingredient to resin input, as well as the desired total system mass transfer rate.

Referring again to the step counter 435, which has been assumed to generate sixteen stepping signals during a cycle, it may be noted that step 12 may be utilized to derive a comparison of the actual total material throughput to the preselected total throughput. In such a case, the gating network 441 simultaneously accepts all of the ingredient input signals 422–433 and transmits a representation of these inputs to the ratio counter 439, which is a conventional binary decimal counter and which thus transmits to the comparator 440 a signal representing the sum of the inputs represented by signals 422–433. In addition, a totalize preset 462 is selected which applies a signal to the comparator 440 representing the preselected total material throughput. During the totalize step, the period counter 436 functions to determine the preselected period of time during which the scanner 420 operates in cyclically accumulating pulses from the inputs 362–373. On completion of the sample period the scanner 420 "turns off." Thus the totalize function has a definite time base.

Any error signal generated by the error counter 445 during step twelve is conducted to the stepper driver selector 442 as hereinbefore explained. However, in this instance, the stepper driver selector 442 will select and actuate the resin stepper driver 463 (or whichever stepper driver corresponds to the ingredient which has been chosen as the base ingredient for the various ratios hereinbefore described).

Referring now to FIG. 16, there may be seen a representation of the controller circuit depicted in FIG. 14. when that circuit is in the step one mode for taking the ratio of PAPI-A to resin. Assuming that the step counter 435 has generated the signal representing or establishing step one, as hereinbefore described, the gating network 441 may be seen to deliver a pulse train 415 to the period counter 436 representing actual resin throughput, and a pulse train 416 to the ratio counter 439 representing actual PAPI-A throughput. The pulse train 415 representing resin throughput may also be seen to be applied to the multiplier 443, as will hereinafter be explained.

The period counter 436, in turn, generates an output signal representing the acquisition of a predetermined number of resin pulses (generally one thousand) and applies this signal to the pulse coincidence comparator 446 by way of the period length gates 437. The gating network 441 and step counter 435 having selected and activated the PAPI-A preset 451, the comparator 440 accordingly will derive a signal representative of the comparison of the actual ratio of the resin and PAPI-A inputs to the preselected ratio thereof, and will apply this signal to the pulse coincidence comparator 446, as hereinbefore described, and the PAPI-A stepper driver 464 will be selected if the measured error (if any) is large enough to require adjustment of PAPI-A throughput.

It should be understood that the pulse coincidence comparator 446 is essentially an OR circuit with respect to the signals received from the period length gates 437 and the comparator 440. If the signal delivered to the pulse coincident comparator 446 from the comparator 440 is received at the same time as the signal from the period length gates 437, the pulse coincidence comparator 446 will not produce an output to the error counter 445. However, if the signal from the comparator 440 arrives at a time different from that of the signal from the period length gates 437, then the pulse coincidence comparator 446 will generate an error control signal having a magnitude proportional to the ratio error, and having a polarity dependent upon whether the signal from the comparator 440 has arrived earlier or later than the signal from the period length gates 437.

The error control signal from the pulse coincidence comparator 446 causes the error counter 445 to determine the PAPI-A error, as hereinbefore stated. However, to reduce "hunting," the step counter 435 also causes the band pass selector 444 to apply a limit of predetermined magnitude to the error counter 445. Thus, if the computed "error" is within the limit, the error counter 445 will generate no output signal. On the other hand, if the error is greater than the preselected limit, the entire computed error signal (not merely the excess) will pass to the multiplier 443.

It will be apparent from the foregoing that a significant feature of the present invention is the fact that the indicator or measurement signals, which are delivered to the scanner circuit 420, are directly related to mass transfer rates and are, therefore, readily comprehended by unskilled or semi-skilled operating personnel. Referring now to FIG. 17, there may be seen a more detailed functional representation of a typical one of the various indicator systems illustrated in FIGS. 11A and 11B for all ingredients other than Freon. In particular, there is shown (for example) the D.C. motor 40 and spur gear 175 hereinbefore described for driving the resin pump (not shown in FIG. 17), together with the magnetic pickup 186 shown in FIG. 11A. As previously explained, the spur gear 175 is provided with sixty equally spaced-apart and magnetically tipped teeth which rotate past the magnetic pickup 186 in functional relationship to the flow of resin into the mixing nozzle 18. Thus, a one-second period sampling of the output signal from the magnetic pickup 186 will reflect the r.p.m. of the D.C. motor 40. Furthermore, since the amplitude of the output signal is related to the proximity of the particular tooth to the magnetic pickup 186 at any one instant, it will be apparent that the output signal reaches the frequency-to-frequency converter 197 (see FIG. 11A) in the form of train of oscillations the period of which is related to the rotational velocity of the spur gear 175.

Referring again to FIG. 17, it will be seen that one advantageous form of the frequency-to-frequency converter 197 includes a Schmitt trigger circuit 331 which responds to the oscillations emitted by the magnetic pickup 186 by generating a functionally related square wave D.C. output signal which is relatively quite linear. As may also be seen, a switch and D.C. voltage hold circuit 332 is provided which is responsive to the square wave D.C. signal from the trigger circuit 331, and which is also responsive to a monotonic output signal being produced by a No. 1 ramp generator 333 having a slope adjustment 334. Essentially, the monotonic signal from the No. 1 ramp generator serves to charge a capacitor in the switch and D.C. voltage hold circuit 332 at a rate determined by the position of the slope adjustment 334. The arrival of a preselected portion of the square wave signal (usually the leading edge of each square wave) may be caused to begin the accumulation of charge by the capacitor, and discharge may be caused by the arrival of the trailing edge of each square wave. Alternatively, each leading edge of the square wave signals may be used both to discharge the capacitor and to initiate accumulation of the next succeeding charge in the sequence. In either event, discharge also acts as a reset signal to the No. 1 ramp generator 333. The ramp amplitude is a function of the square wave period. The peak ramp amplitude may be held in the D.C. hold circuit 332 after the reset of the No. 1 ramp generator 333.

The D.C. output signal from the switch and D.C. voltage hold circuit 332 may be seen to be applied to the input side of a voltage comparator circuit 337 which is also responsive to a ramp voltage signal from a No. 2 ramp generator 335. The No. 1 ramp generator will be reset each time the ramp voltage equals the D.C. voltage from the D.C. hold circuit 332. Thus, the output signal from the voltage comparator circuit 337 is a series of pulse peaks which are directly indicative of each preselected unit of resin being transferred into the mixing nozzle 19 by the operation of the resin pump 30. Within the limits of capacitor size, etc., the r.p.m. signal from the D.C. motor 40 can be adjusted to deliver pulses at any desired rate to the scanner circuit 420, by way of conductor 362, to give the operator the most suitable indication of resin transfer, since the No. 2 ramp generator 335 is also preferably provided with a similar slope adjustment 336. Accordingly, the pulse peaks in conductor 362 may be made directly indicative of pounds of resin per minute, gallons per hour, or any other relationship which may be desired, and this signal or measurement may be delivered directly to the scanner circuit 429.

Referring again to FIG. 16 and to the multiplier 443 illustrated therein, it will be apparent that the controller system is preferably intended to receive and respond to indicator signals arriving at a very high frequency, and that it is accordingly further desirable for obtaining maximum control resolution that the controller system "see" as many indicator pulses as possible during any preselected measurement period. As hereinbefore stated, the frequency of each of the signals arriving in conductors 362–373 is "weighted" to be functionally representative of the mass transfer rate of the particular fluid component associated with that signal, and is further an explicit function of time. For example, an input pulse frequency of 7,562 pulses per second in conductor 362 may signify a mass transfer rate of 75.62 pounds of resin per minute into the mixing nozzle 18.

When the controller system operates to provide a measurement of the ratio of PAPI-A to resin, as hereinbefore explained, it will be apparent that any error signal in the error counter 445 will be representative of the ratio error of the ratio of PAPA-A mass transfer rate with respect to a preselected base rate of resin mass transfer, and that the error is therefore an implicit function of time. Moreover, it will also be apparent that the same ratio or ratio error may exist for any number of different pairs of frequencies.

As may be seen, it is desirable to actuate a particular one of the bi-directional stepper motors 400–411 to achieve an exact mass transfer rate correction for the particular fluid component to eliminate the error so detected and measured. Accordingly, it is desirable to convert ratio error to mass transfer rate error, and the multiplier 443 is provided for the purpose of multiplying the ratio error by a factor representative of or functionally related to the ratio of the base component (resin) mass transfer rate frequency with respect to the base component (resin) period base number. For example, if the resin throughout rate is 75.62 pounds per minute, a frequency signal of 7,562 pulses per second will be applied to the period counter 436, and if the period length gates 437 are pre-programmed for a period of 1,000 pulses of base (resin) material, the period base number will be 1,000. Thus, the ratio-to-mass transfer rate correction factor will be 7,562÷1,000, or 7.562.

When a "totalize" measurement is made of the total system mass transfer rate, the error signal in the error counter 445 is a direct functional representation of the total mass transfer error, and this signal is therefore an explicit function of time. Although such a signal may be used for correctional purposes, it will be apparent that it is representative of the sum of all of the individual fluid mass transfer rate errors and cannot, therefore, be used to adjust the transfer rate of any particular fluid component.

Assuming that resin has been selected as the master or base component, as hereinbefore stated, it will be apparent that it is necessary to correct an error in the total material throughput rate by adjusting the rate of resin mass transfer. However, this is achieved by means of the bi-directional stepper motor 400, and thus it is necessary to determine the exact number of error pulses to apply to the resin stepper driver 463. Accordingly, in the system illustrated in FIG. 16, this is achieved by determining the ratio of the resin mass transfer rate with respect to the total mass transfer rate and by multiplying the total error held in the error counter 445 by a factor representative of the resin mass transfer rate divided by the total error, which factor will obviously never be greater than unity.

Thus, it will be apparent that the multiplier circuit 443 is provided for the purpose of sampling the incoming resin (or other base component) mass transfer rate frequency for deriving the appropriate "error multiplier" factor, and for converting the error count held in the error counter 445 into a pulse train definitive in number of the number of mass transfer rate units of error sought to be corrected with respect to the resin pumping system. As may be further seen in FIG. 16, this pulse train is applied through the stepper driver selector circuit 442 to the appropriate stepper driver.

Referring now to FIG. 18, there may be seen a functional representation of the basic components in the multiplier 443, which components are arranged and adapted to count the number of resin pulses (for example) being received during the sampling period. In particular, there is provided a binary decimal counter 552 connected to receive either the resin pulse train from conductor 415 (see FIG. 16), or the pulse train from a stepper control oscillator 601 through a pulse level selector 603, depending on the position of the switch 553 which is actuated by the control circuit 555 in response to the clock 434 illustrated in FIG. 16. If it is assumed that the clock 434 generates a period signal of 0.1 second, when the controller system is in the ratio mode, the switch 553 will admit the resin pulse train to the counter 552 during that interval. At the end of the 0.1 sampling period, the accumulated total in the counter 552 is transferred to a holding register 554, the counter 552 is cleared, and the complement of the accumulated total is transferred back to the counter 552 without clearing the holding register 554. The counter 552 is then pulsed once to add the necessary "plus one," and the switch 553 shifts to admit the pulse train from the pulse level selector 603.

As may be seen in FIG. 18, the stepper oscillator 601 is arranged to generate a pulse train which passes to a dividing network 602 containing a divide-by-ten stage and a divide-by-one-hundred stage respectively and sequentially arranged therein. Accordingly, the pulse train from the stepper oscillator 601 is initially divided by ten during the ratio control mode multiplier function, as provided by the pulse level selector 603 (which is controlled by the step counter 435) gating the pulse train after it passes through the divide-by-ten stage. The counter 552 is counted until it contains the maximum possible number of "ones," whereupon the counter 552 "overflows" on the next received pulse to generate a "carry" pulse to the error counter 445 and to thereby reduce the error count held in the error counter 445 by "one." As may be seen, each time a "carry" pulse is generated by the control circuit 555, the multiplier counter 552 is reloaded with the accumulated signal in the holding register 554, and is then pulsed once to "add one" as hereinbefore stated.

This cycle is repeated until the error count held in the error counter 445 is reduced to zero, whereupon the stepper oscillator 601 is inactivated. During the entire cycle, however, in which the ratio error is being counted out of the error counter 445, the 2 stepper oscillator 601 generates a train of pulses which passes through the dividing network 602 to the selected one of the stepper drivers 463–474, causing the associated bi-directional stepper motor to properly adjust its associated ten-turn control potentiometer and to thereby adjust the associated SCR controller or servo amplifier accordingly.

It will be apparent that it is desirable that the frequency range of the stepper oscillator 601 be many times greater than the operating ranges of the various stepper motors 400–411 sought to be controlled. For example, the frequency of the stepper oscillator 601 may be selectively adjustable through a range which is one thousand times greater than that through which the bi-directional stepper motors 400–411 may operate and track discretely.

During the totalize operating mode of the controller system, the function of the multiplier 443 may be essentially the same as hereinbefore explained. However, during the totalize mode the control circuit 555 will preferably receive its control signal from the period length gates 437, causing the switch 553 to admit resin pulses in conductor 415 to the counter 552 for a period equal to one thousand pulses of the totalize frequency accumulated in the period counter 436, by the scanner circuit 420, in the manner hereinbefore described. Accordingly, the pulse level selector 603 will apply the undivided output frequency from the stepper oscillator 601 directly to the counter 552, instead of passing it first through the dividing network 602 as hereinbefore described.

The counter 552 may be of any suitable size, depending upon the input frequencies expected to the accommodated. For example, if the counter 552 is twelve "bits" long, it can accumulate a total count of 4096, and thus can keep track of a frequency input on conductor 415 of up to a maximum of 40.96 kilocycles.

As hereinbefore stated, the controller system is adapted to sample through any desired number of stages, and in the system disclosed in FIG. 16, the step counter 435 cycles the gating network 441 through sixteen stages. Stages Nos. 1–11 include those stages wherein the ratios of the flow rates of each of the various ingredients with respect to a preselected ingredient are sampled, and stage No. 12 involves sampling the total rate of material throughput. Stages Nos. 13–16 may be used for sampling the ratios of any other ingredients not heretofore mentioned, in those instances wherein a different formulation may be desired, or for the measurement and/or adjustment of other system parameters such as the angle of inclination of the tunnel mold 210 (see FIG. 2), or such as the length of the dwell interval of the travel of the mixing noozle 18 and spout 19 transversely across the tunnel mold 210.

In particular, however, it is desired to sample the speed of the bottom and side belts 212 and 256, since the speed of the belts is directly related to the total rate of material throughput. Accordingly, it is desirable to move the tunnel belts 212 and 256 at a velocity such that a predetermined volume of material per foot of conveyor belt will be deposited on the bottom paper 232, and this may be achieved by providing another preset such as presets 450–462 for the purpose of establishing a set point for this parameter, and the motor 264 illustrated in FIG. 2 may include a spur gear and frequency-to-frequency converter system such as that illustrated in FIG. 17 for providing indications of tunnel travel rate which are compatible with other circuitry as hereinbefore described.

The controller system illustrated in FIG. 14 will operate to sample tunnel velocity in the same manner as when total material throughput is sampled. However, the frequency measurement signal from the converter related to the tunnel belt motor 264 may be used instead of the clock 434 signal, and instead of correcting errors by applying the error signal to adjust the resin pump 30 output, the error signal may be applied to the controller 278 illustrated in FIG. 12.

It is another feature of the present invention to provide a tunnel mold having a top panel arrangement, as well as a bottom panel and side panels. It is a further feature to provide an arrangement of top pans as depicted in FIG. 2 wherein the top pans are each provided with a lip which underrides the adjacent pan, so as not to impede travel of the bun through the tunnel. It is also a feature of the present invention to provide segmented side and top panels, so as to permit the dimensions of the tunnel to be adjusted along its length to provide for greater control over the foam and the resulting bun in the tunnel.

A particular feature is that the rectangular cross-sectional shape of the polyurethane bun is particularly provided by so controlling the foaming reaction so that, in the overall context of the reaction period, the gel point of the foamed polymer mass is proximate in time to the "crown point" (the point in time) at which the rising of the foam is substantially completed. If the gel point too far precedes the crown point, and if the rising action of the foam continues after the foamed mass is gelled and set, a rupturing of the foam often occurs as the foaming mass tends to expand to fill the corners of the rectangular tunnel. Although manipulation of the relative occurrence of the gel point and the crown point is possible by selection of tunnel length and inclination, variation of conveyor speed, and by altering the reactant's combination and proportion, the factor of tunnel length is for practical purposes limited in any single foaming apparatus.

It has been surprisingly found that incorporation of small amounts of suitable flowing agents in the foam recipe tends to prolong the plastic nature of a rising foam bun such that the foam does not set so rigidly prior to completion of the rising action. These flowing agents, though they do not measurably alter the beneficial properties of the ultimate foam product, do perform a type of plasticizing action during the foaming procedure, in that the flowability of the cellular matrix of the foam is preserved during the foaming reaction. Accordingly, as the foam in the final stages of its rising action expands to a rectangular cross-section, the cellular matrix tends to flow in the direction of the expanding action and without rupture. This plasticizing function is apparently, however, temporary, and the flowing agents do not appear to impart a plasticized character to the ultimate product. It has been found that ultimate foams incorporating such flowing agents are characterized by more uniformly spherical cells in these portions of the foam where stretching would normally have otherwise occurred.

Generally, flowing agents are employed in small amounts sufficient to produce flowability during the last rising stages of the foam reaction and to preserve the flowability of the cellular matrix. Suitably, less than five percent by weight of flowing agent based upon the weight of the polyol or "resin" is employed. Eminently satisfactory results are obtained at significantly lower concentrations down to about 0.25 percent by weight based upon the resin weight. Most preferably, however, from about 0.5 to about two percent by weight of flowing agent based upon the resin is employed.

Use of flowing agents, hereinafter disclosed, in amounts substantially in excess of those prescribed above often result in a production of a softer foam in which the physical properties are not generally desirable. Furthermore, as the proportion of flowing agent increases to such an extent as to effect ultimate foam properties, the flowing agent appears to lose its effectiveness in promoting the flowability of the cellular matrix. Thus it has been found that if flowing agents are added in amounts up to fifteen percent by weight based upon the weight of the resin, the physical properties deteriorate and rectangularity of the bun becomes again more difficult to achieve.

In those cases where the operating personnel are expected to exercise manual control of the system, the flowing agent may be effectively added in a 60% flowing agent admixture with another ingredient, since only relatively small quantities are used, as may be seen in FIG. 1, and since it is easier to control large flows than to control relatively small flows. Accordingly, it is convenient to combine the flowing agent with the amine catalyst in Tank No. 2, whereby the flowing agent will provide the additional benefit of furnishing lubricity and body to the fluid stream flowing in outlet line 8.

On the other hand, automatic system control as performed by the Controller portion of the present invention provides a degree of control precision which is unattainable with manual control of the overall system. Hence, it is usually preferable to maintain the flowing agent separate in Tank No. 7, as hereinbefore illustrated.

Typical flowing agents which impart the desired flowability to the foam matrix include the long chain fatty acids and oils, which are otherwise compatible with the foam formulation, particularly the compatible naturally occurring oils which generally comprise the mixed triglycerides of long chain fatty acids. Highly preferred is castor oil which is a triglyceride mixture containing a predominant amount of ricinoleic acid. Castor oil exhibits a ready compatibility with the other foam formulation components, and by virtue of its ready availability and inexpensive cost is an ideal flowing agent.

As stated above, the flowing agents which are employed to promote the flowability of the cellular matrix must be compatible with the other formulation components, i.e., the flowing agents cannot be such that they form a separate phase upon their addition to the system. For example, in PAPI-containing foam formulations, such compounds as various of the stearate esters and triglycerides, which otherwise might be potential flowing agents serve as gross antifoamers and foam suppressors by creating a separate phase in the formulation. Although the explanation for this antifoam effect is not known, it is postulated that the interface produced by the stearate draws the foaming surfactant to the interface and tends to inhibit the overall foaming action.

It is also a feature of the present invention to use phosphoric acid as an ingredient in the manufacture of polyurethane foam, as will hereinafter be apparent. The various ingredients which are blended together in the mixing nozzle 18 are not actually miscible, and thus there is a tendency for the heavier or denser ingredients to settle out during the interval between the instant wherein the mixture is poured onto the bottom paper 232, and the instant when the reaction begins to effectively proceed. This is particularly undesirable, however, since any appreciable separation of the ingredients will tend to adversely affect the isotropicity of the resultant polyurethane bun.

Accordingly, it is desirable to facilitate the reaction by employing a maximum proportion of catalyst in the mixture, whereby the initial liquid stage of the process can be kept to a minimum. Unfortunately, to do so in conventional systems effectively creates a worse problem, since the rise time of the foam front will also be proportionately shortened, and there will be a tendency for the foam front to roll back onto the liquid or "cream" stage of the reaction, whereby the isotropicity of the bun will also be adversely affected.

Although the exact reason is not clearly understood, it is an established fact that the addition of suitable quantities of phosphoric acid to the mixture in the mixing nozzle 18 will provide the unique benefit of slowing or delaying only the gellation state of the reaction. Thus a maximum amount of catalyst may be employed to facilitate commencement of the reaction, since the phosphoric acid may be depended on to retard the reaction during the gellation or rise stage without retarding the reaction during the "cream" stage.

As hereinbefore stated, it is not entirely understood why phosphoric acid is capable of achieving this beneficial result. However, it would appear that phosphoric acid performs its function of delaying the reaction only after the heat which is generated during the cream stage has been dissipated.

Many other modifications will be apparent from a consideration of the methods and apparatus hereinbefore described and depicted in the accompanying drawings. Accordingly, the forms of the present invention described herein, and illustrated in the accompanying drawings, are intended as examples only, and are not intended as limitations on the present invention.

What is claimed is:

1. A system for continuously providing a polyurethane foam product or the like, comprising
   a plurality of separate tank means containing a corresponding number of different liquid reactants including a resin, an isocyanate, and a blowing agent,
   first mixing means for combining a plurality of said reactants inculding said resin into a first mixture,
   second mixing means for separately receiving said isocyanate, said blowing agent, and said first mixture, and for combining all received reactants into a second reacting mixture,
   a plurality of separate driving means interconnected with said tank means for controllably delivering said reactants to said first and second mixing means respectively,
   indicating means for deriving a corresponding plurality of trains of measurement pulses functionally representative of the mass transfer rate of each of said reactants into said second mixing means,
   molding means for receiving said second reacting mixture and for conveying foam product therefrom, and
   controller means responsive to said measurement pulses for generating a plurality of control signals for selectively and continuously controlling said driving means to establish the mass transfer rate of each of said reactants substantially at pre-established levels.

2. The system described in claim 1, wherein said indicating means includes a plurality of pulse generating circuits associated with said driving means.

3. The system described in claim 2, wherein each of said pulse generating circuits comprises
   a first signal generator for providing a wave train having a frequency functionally representative of the operation of said driving means associated therewith, and
   a second signal generator responsive to said wave train for generating one of said trains of measurement pulses at a frequently functionally corresponding to the mass transfer rate of the liquid reactant transferred by said associated driving means.

4. The system described in claim 3, wherein said second signal generator comprises a frequency-to-frequency converter including
   a first pulse shaping circuit responsive to said first train of pulses for deriving therefrom a corresponding train of substantially rectangular pulses, and
   a second pulse shaping circuit responsive to said rectangular pulses for generating said second train of pulses.

5. The system described in claim 4, wherein said converter further includes
   adjacent means interconnected therewith for selectively varying the frequency of said second train of pulses in a manner functionally related to the frequency of said rectangular pulses.

6. The system described in claim 5, wherein said adjustment means includes
   an adjustable voltage means responsive to said rectangular pulses for generating a voltage functionally related in magnitude to the frequency of said rectangular pulses.

7. The system described in claim 6, wherein said adjustment means further includes
   voltage means interconnected between said first and second shaping circuits and responsive to said rectangular pulses for providing said voltage functionally related in magnitude to the frequency of said rectangular pulses,
   a first adjustment circuit for selectively varying the functional relationship of the magnitude of said voltage with respect to the frequency of said rectangular pulses, and
   second adjustment circuit for selectively varying the functional relationship of the frequency of said second train of pulses with respect to the magnitude of said voltage.

8. The system described in claim 7, wherein said controller means includes a plurality of control circuits associated with said driving means.

9. The system described in claim 8, wherein at least one of said control circuits includes
   a signal source for supplying a driving signal, and
   motor means for controlling an associated one of said driving means according to the magnitude of said driving signal.

10. The system described in claim 9, wherein said one control circuit further includes
    bi-directional stepping means adjusting the magnitude of said driving signal.

11. The system described in claim 10, wherein said controller means further includes
    a plurality of preset means for providing a plurality of separate preset signals functionally representative of said pre-established levels, and
    comparison means responsive to said preset signals and to said second train of pulses provided by said frequency-to-frequency converter in each of said pulse generating circuits in said indicating means for deriving therefrom a functionally related adjustment signal.

12. The system described in claim 11, wherein said comparison means comprises
    controller adjustment means selectively responsive in a time dependent manner to said preset means and said second train of pulses provided by said converter in each of said pulse generating circuits in said indicating means for deriving said adjustment signal as a train of adjustment pulses functionally related in number thereto.

13. The system described in claim 12, wherein said comparison means further comprises
    counting means for counting said adjustment pulses in a time dependent and bi-directional manner and deriving therefrom a control signal functionally related in magnitude to the number of said counted adjustment pulses.

14. The system described in claim 13, wherein said comparison means further comprises
    limit means for limiting said control signal to only signals having a preselected minimum magnitude.

15. The system described in claim 14, wherein said controller means further includes
    correction means for adjusting said control signal in a manner functionally related to any difference between the time base of the mass transfer rate indicated by said converter and the time base of said comparison means.

16. The system described in claim 15, wherein said correction means includes
a multiplier interconnected to derive a corrected control signal functionally related to the product of said control signal and a factor functionally related to the ratio of the time base of said comparison means to the time base of the mass transfer rate indicated by said converter.

References Cited

UNITED STATES PATENTS

| 2,885,268 | 1959 | Breer et al. | 18—12 F X |
| 3,000,438 | 1961 | Alexander | 18—2 HA UX |
| 3,265,786 | 1966 | Voelker | 18—12 F UX |

H. A. KILBY, JR., Primary Examiner

U.S. Cl. X.R.

425—115, 130, 145, 162, 155, 315